US012316561B2

(12) United States Patent
Fan

(10) Patent No.: US 12,316,561 B2
(45) Date of Patent: May 27, 2025

(54) DATA TRANSMISSION METHOD, DEVICE, CHIP, AND READABLE STORAGE MEDIUM

(71) Applicant: HUAWEI TECHNOLOGIES CO., LTD., Guangdong (CN)

(72) Inventor: Bo Fan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 471 days.

(21) Appl. No.: 17/887,506

(22) Filed: Aug. 14, 2022

(65) Prior Publication Data

US 2022/0393823 A1 Dec. 8, 2022

Related U.S. Application Data

(63) Continuation of application No. PCT/CN2020/075416, filed on Feb. 14, 2020.

(51) Int. Cl.
*H04W 72/0446* (2023.01)
*H04L 5/00* (2006.01)

(52) U.S. Cl.
CPC ....... *H04L 5/0048* (2013.01); *H04W 72/0446* (2013.01)

(58) Field of Classification Search
CPC .......................... H04L 5/048; H04L 72/0446
USPC ........................................................ 370/329
See application file for complete search history.

(56) References Cited

U.S. PATENT DOCUMENTS

2021/0144722 A1* 5/2021 Yang .................. H04L 25/0226

FOREIGN PATENT DOCUMENTS

| CN | 103874190 A | 6/2014 |
|---|---|---|
| CN | 109089322 A | 12/2018 |
| CN | 110536452 A | 12/2019 |
| CN | 110769502 A | 2/2020 |
| CN | 115190614 A * | 10/2022 |
| EP | 4027726 A1 | 7/2022 |
| WO | 2018175784 A1 | 9/2018 |
| WO | 2019200313 A1 | 10/2019 |
| WO | 2020020128 A1 | 1/2020 |

OTHER PUBLICATIONS

Ericsson, PUSCH Enhancements for NR URLLC. 3GPP TSG RAN WG1 Meeting #99, Reno, USA, Nov. 18-22, 2019, R1-1911947, 15 pages.
3GPP TS 38.331 V15.5.0 (Mar. 2019), 3rd Generation Partnership Project; Technical Specification Group Radio Access Network; NR; Radio Resource Control (RRC) protocol specification (Release 15), total 491 pages.
3GPP TS 38.211 V15.5.0 (Mar. 2019), 3rd Generation Partnership Project; Technical Specification Group Radio Access Network; NR; Physical channels and modulation(Release 15), 96 pages.

(Continued)

*Primary Examiner* — Sibte H Bukhari

(57) ABSTRACT

A data transmission method, a device, a chip, and a readable storage medium are disclosed, to perform PUSCH repetition transmission by using a plurality of beams, and improve reliability of transmission. In embodiments of this application, a terminal device determines a plurality of SRS resources, the plurality of SRS resources correspond to a plurality of beams, and the terminal device performs many PUSCH repetition transmissions based on the plurality of beams, to improve reliability of the PUSCH repetition transmission.

17 Claims, 10 Drawing Sheets

(56) References Cited

OTHER PUBLICATIONS

3GPP TS 38.212 V15.5.0 (Mar. 2019), 3rd Generation Partnership Project; Technical Specification Group Radio Access Network; NR; Multiplexing and channel coding(Release 15), 101 pages.
3GPP TS 38.213 V15.5.0 (Mar. 2019), 3rd Generation Partnership Project; Technical Specification Group Radio Access Network;NR;Physical layer procedures for control(Release 15), total 104 pages.
3GPP TS 38.214 V15.5.0 (Mar. 2019), 3rd Generation Partnership Project; Technical Specification Group Radio Access Network; NR; Physical layer procedures for data(Release 15), 103 pages.

* cited by examiner

DATA TRANSMISSION METHOD, DEVICE, CHIP, AND READABLE STORAGE MEDIUM

CROSS-REFERENCE TO RELATED APPLICATIONS

This application is a continuation of International Application No. PCT/CN2020/075416, filed on Feb. 14, 2020, the disclosure of which is hereby incorporated by reference in its entirety.

TECHNICAL FIELD

This application relates to the communication field, and in particular, to a data transmission method, a device, a chip, and a readable storage medium.

BACKGROUND

A fifth generation (5G) mobile communication system may use high-frequency communication, may use an ultra-high frequency band (>6 GHz) signal to transmit data. A main problem of the high-frequency communication is that energy of a signal sharply decreases as a transmission distance increases, resulting in a short transmission distance of the signal. To overcome this problem, the high-frequency communication adopts an analog beam technology in which a large-scale antenna array is used for signal processing, so that signal energy is concentrated in a relatively small range to form a signal similar to a beam (where the signal is referred to as an analog beam, and a beam for short), thereby extending a transmission distance.

In addition, in the R16 protocol, to improve reliability of physical uplink shared channel (PUSCH) transmission, a same PUSCH may be transmitted in a plurality of continuous time units. For example, one PUSCH is transmitted in each of a plurality of continuous slots, to improve the reliability of the PUSCH transmission. However, in the R16 protocol, PUSCH repetition transmission is single-beam-based repetition transmission. In other words, a same beam is used for all PUSCH transmissions. Once quality of the beam used for all the PUSCH transmissions deteriorates, for example, the beam is suddenly blocked by an obstacle, all the PUSCH transmissions may fail. It can be learned that the reliability of the PUSCH transmission is relatively low.

SUMMARY

This application provides a data transmission method, a device, a chip, and a readable storage medium, to perform PUSCH repetition transmission by using a plurality of beams, and improve reliability of transmission.

According to a first aspect, this application provides a data transmission method. The method may be performed by a terminal device, or may be performed by a chip disposed inside the terminal device. For ease of description, an example in which the terminal device is used as an execution body is used for description in this application. In the data transmission method, the terminal device determines L sounding reference signal (SRS) resources, where L is an integer greater than 1, and at least two of the L SRS resources correspond to different spatial relations; and the terminal device performs Q PUSCH transmissions by using the L SRS resources, where Q is an integer greater than 1. At least two of a plurality of SRS resources correspond to different spatial relations. In this case, PUSCH repetition transmission is performed by using the plurality of SRS resources, that is, PUSCH repetition transmission is performed based on a plurality of beams, so that reliability of the transmission can be improved.

In an implementation, any two of the L SRS resources correspond to different spatial relations. In this case, more beams can be used for the PUSCH repetition transmission, so that reliability of data transmission can be further improved.

In an implementation, that a terminal device determines L SRS resources includes: The terminal device receives first information; and the terminal device determines, based on a field value of a first field in the first information and a preset correspondence between a field value and an SRS resource, the L SRS resources indicated by the field value of the first field. The preset correspondence between a field value and an SRS resource satisfies the following content: one field value is used to indicate one or more SRS resources, and when one field value is used to indicate a plurality of SRS resources, any two of the plurality of SRS resources correspond to different spatial relations. In this case, a plurality of SRS resources that are indicated by the network device and that have different spatial relations may be determined based on the field value of the first field, and the manner of indicating the plurality of resources is simple and easy to implement.

In an implementation, the first information is downlink control information, and the first field includes an SRS resource indicator field in the downlink control information. In this way, the current technologies can be well compatible with, the first field in the downlink control information may be occupied, and modifications made to the current technologies are small.

In an implementation, in K SRS resources configured by the network device for the terminal device, SRS resources with a same spatial relation are in one resource group, and the K SRS resources include a plurality of resource groups; the L SRS resources correspond to L resource groups in the plurality of resource groups; and any two of the L SRS resources correspond to different resource groups. SRS resources are grouped based on spatial relations, so that during indication, one SRS resource may be selected from each group and indicated to the terminal device, so that a plurality of beams are indicated to the terminal device. This solution is simple and easy to implement.

In an implementation, the preset correspondence between a field value and an SRS resource satisfies the following content: one field value is used to indicate one or more of the K SRS resources, and when one field value is used to indicate a plurality of SRS resources, any two of the plurality of SRS resources correspond to different resource groups. In this case, when one field value is used to indicate a plurality of SRS resources, where the plurality of SRS resources are from different resource groups, resource combination forms can be reduced. For example, one field value may be filtered out to indicate a form of a plurality of SRS resources from a same group, so that fewer field values need to be set.

In an implementation, that the terminal device performs Q PUSCH transmissions by using the L SRS resources includes: When an uplink transmission mode is uplink full power transmit mode (ULFPTxMode) mode 2, the terminal device performs the Q PUSCH transmissions by using the L SRS resources. The SRS resources may be grouped based on the spatial relations in the transmission mode, so that when the solution provided in this application is performed in the transmission mode, the solution can be further compatible with the current technologies.

In an implementation, the uplink full power transmit mode is configured as Mode 2. In an implementation, when the uplink transmission mode is codebook-based transmission, the terminal device performs the Q PUSCH transmissions by using the L SRS resources. In this way, transmission modes applicable to this application can be extended.

In an implementation, that the terminal device performs Q PUSCH transmissions by using the L SRS resources includes: The terminal device performs, by using the L SRS resources, the Q PUSCH transmissions on time domain resources corresponding to the L SRS resources. The time domain resources corresponding to the L SRS resources are the same, or time domain resources corresponding to any two of the L SRS resources are different. In this case, flexibility of implementing the solution can be improved, and a plurality of manners of PUSCH repetition transmission in the current technologies can be compatible.

In an implementation, before that the terminal device performs Q PUSCH repetition transmissions by using the L SRS resources, the method further includes: The terminal device determines a PUSCH repetition transmission mode. The PUSCH repetition transmission mode includes one or more of the following: simultaneous repetition transmission performed based on a plurality of SRS resources, where the simultaneous repetition transmission performed based on a plurality of SRS resources indicates that a PUSCH is simultaneously transmitted by using the L SRS resources, and time domain resources corresponding to the L SRS resources are the same; and time-division repetition transmission performed based on a plurality of SRS resources, where the time-division repetition transmission performed based on a plurality of SRS resources indicates that a PUSCH is transmitted in a time-division manner by using the L SRS resources, and time domain resources corresponding to the L SRS resources are different. In this case, flexibility of the solution can be extended, and more PUSCH transmission modes can be used.

In an implementation, before that the terminal device performs Q PUSCH transmissions by using the L SRS resources, the method further includes: if a network device indicates the L SRSs, and one or more of the following conditions are satisfied, determining to use the mode of simultaneous repetition transmission performed based on a plurality of SRS resources:

the network device indicates that a PUSCH transmission mode is simultaneous repetition transmission; the network device indicates that a quantity of PUSCH transmissions is equal to 1; the network device does not indicate the quantity of PUSCH transmissions; and demodulation reference signal (DMRS) ports indicated by the network device belong to a same DMRS code division multiplexing (CDM) group. During implementation, a condition for performing the simultaneous repetition transmission mode based on a plurality of SRS resources may be flexibly selected and determined, so that the flexibility of the solution is improved.

In this application, "the network device uses the mode of simultaneous repetition transmission performed based on a plurality of SRS resources" may be replaced with "the time domain resources corresponding to the L SRS resources indicated by the network device are the same".

In an implementation, before that the terminal device performs Q PUSCH transmissions by using the L SRS resources, the method further includes: If a network device indicates the L SRSs, and one or more of the following conditions are satisfied, determining that the network device uses the mode of time-division repetition transmission performed based on a plurality of SRS resources: the network device indicates that a PUSCH transmission mode is time-division repetition transmission; the network device indicates that a quantity of PUSCH transmissions is greater than 1; and DMRS ports indicated by the network device belong to a same DMRS CDM group. During implementation, a condition for performing the time-division repetition transmission mode based on a plurality of SRS resources may be flexibly selected and determined, so that the flexibility of the solution is improved. In implementation, conditions for determining that a transmission mode is the simultaneous repetition transmission or the time-division repetition transmission may be flexibly selected, but a conflict cannot exist. For details, refer to the descriptions of the implementations.

In this application, "the network device uses the mode of time-division repetition transmission performed based on a plurality of SRS resources" may be replaced with "the time domain resources corresponding to the L SRS resources indicated by the network device are different".

In an implementation, before that the terminal device performs Q PUSCH transmissions by using the L SRS resources, the method further includes: The terminal device determines, based on a first correspondence between an SRS resource and a PUSCH transmission, an SRS resource used for each of the Q PUSCH transmissions. The first correspondence between an SRS resource and a PUSCH transmission includes: sequentially mapping resources to all transmissions based on a configuration order of the resources, and if there is still a remaining quantity of transmissions to which no resource is mapped, sequentially and cyclically mapping the resources to the remaining quantity of transmissions based on the configuration order of the resources. Alternatively, in other words, when Q is not greater than L, the L SRS resources are sequentially mapped to the Q PUSCH transmissions based on a configuration order; or when Q is greater than L, the L SRS resources are sequentially mapped to the first L PUSCH transmissions in the Q PUSCH transmissions based on a configuration order, and the L SRS resources are cyclically and repeatedly mapped to the remaining (Q–L) PUSCH transmissions based on the configuration order. Because different SRS resources are used for adjacent transmissions, reliability of data transmission can be further improved.

In an implementation, the first correspondence between an SRS resource and a PUSCH transmission includes: sequentially mapping resources to all transmission groups based on a configuration order of the resources by using P continuous transmissions as one transmission group, and if there is still a remaining transmission group to which no resource is mapped, sequentially and cyclically mapping the resources to the remaining transmission group based on the configuration order of the resources. Alternatively, in other words, the P continuous PUSCH transmissions are used as a transmission group, and the Q continuous PUSCH transmissions are grouped into O transmission groups. When O is not greater than L, the L SRS resources are sequentially mapped to the O transmission groups based on a configuration order. When O is greater than L, the L SRS resources are sequentially mapped to the first L transmission groups in the O transmission groups based on a configuration order, and the L SRS resources are cyclically and repeatedly mapped to the remaining (O-L) transmission groups based on the configuration order. P is an integer greater than 1. In this case, one beam may be continuously used for P times before being switched, so that beam switching frequency is reduced and resources can be saved.

In an implementation, the first correspondence between an SRS resource and a PUSCH transmission includes:

sequentially mapping resources to all transmission groups based on a configuration order of the resources by using P continuous transmissions as a transmission group, and if there is still a remaining quantity of transmissions to which no resource is mapped, sequentially and cyclically mapping the resources to the remaining quantity of transmissions based on the configuration order of the resources. Alternatively, in other words, the P continuous PUSCH transmissions are used as a transmission group, and the Q continuous PUSCH transmissions are grouped into O transmission groups. When O is not greater than L, the L SRS resources are sequentially mapped to the O transmission groups based on a configuration order. When O is greater than L, the L SRS resources are sequentially mapped to the first L transmission groups in the O transmission groups based on a configuration order, and the L SRS resources are cyclically and repeatedly mapped to the remaining (Q-L*P) PUSCH transmissions based on the configuration order. In this case, one beam may be continuously used for P times before being switched, so that beam switching frequency is reduced and resources are saved.

In an implementation, a value of P is reported by the terminal device to the network device by using a terminal capability parameter. In this way, the terminal device may determine, based on a capability of the terminal device, a quantity of continuous transmissions that need to be performed before beam switching, so that the capability of the terminal device can be considered on the premises that the reliability of data transmission is improved.

In an implementation, the first correspondence is indicated by using radio resource control (RRC) signaling. In this way, the current technologies can be compatible with, and modifications made to the current technologies are small.

In an implementation, the first correspondence is reported by using a terminal capability reporting parameter. In this way, the current technologies can be compatible with, and modifications made to the current technologies are small.

In an implementation, if the network device indicates a plurality of SRS resources, and configures a PUSCH repetition transmission type as type B, or in other words, configures the PUSCH repetition transmission type as PUSCH repetition type B, the PUSCH transmission includes E nominal transmissions, the Q PUSCH transmissions are Q actual transmissions corresponding to the E nominal transmissions, each nominal transmission corresponds to one or more actual transmissions, and E is a positive integer. In other words, a correspondence between an SRS resource and an actual transmission may be determined, so that the solution can be simplified. In an implementation, a mapping relationship between the L SRS resources and the Q actual transmissions is determined by using the first correspondence between a resource and a quantity of transmissions.

In an implementation, if the network device indicates a plurality of SRS resources, and configures a PUSCH repetition transmission type as PUSCH repetition type B, the PUSCH transmission includes E nominal transmissions, each nominal transmission corresponds to one or more actual transmissions, and E is a positive integer. That the terminal device determines, based on the L SRS resources and a preset first correspondence between a resource and a quantity of transmissions, an SRS resource used for each of the Q PUSCH transmissions includes: The terminal device determines, based on the L SRS resources and the preset first correspondence between a resource and a quantity of transmissions, an SRS resource corresponding to each of the E nominal transmissions; and the terminal device determines, based on the SRS resource corresponding to each nominal transmission, an SRS resource corresponding to an actual transmission corresponding to the nominal transmission. In this implementation, a correspondence between an SRS resource and a nominal transmission may be determined based on the first correspondence, and then a correspondence between a resource and an actual transmission is determined, so that the flexibility of the solution can be improved.

In an implementation, that the terminal device determines, based on the SRS resource corresponding to each nominal transmission, an SRS resource corresponding to an actual transmission corresponding to the nominal transmission includes: for each nominal transmission, determining that an SRS resource corresponding to the nominal transmission is used for an actual transmission corresponding to the nominal transmission; or for each nominal transmission, determining, based on the L SRS resources and the preset first correspondence between a resource and a quantity of transmissions, an SRS resource used for each actual transmission corresponding to the nominal transmission, where an SRS resource corresponding to the first actual transmission corresponding to the nominal transmission is an SRS resource ranking first in the configuration order of the L SRS resources, or an SRS resource corresponding to the nominal transmission. In this way, a beam can be switched between two adjacent nominal transmissions, so that the reliability of data transmission can be improved.

In an implementation, if the network device indicates a plurality of SRS resources, and configures a PUSCH repetition transmission type as PUSCH repetition type B, the PUSCH transmission includes E nominal transmissions, each nominal transmission corresponds to one or more actual transmissions, and E is a positive integer. Before that the terminal device performs Q PUSCH transmissions by using the L SRS resources, the method further includes: The terminal device determines a redundancy version (RV) identifier corresponding to each of the E nominal transmissions; and the terminal device determines, based on the RV identifier corresponding to each nominal transmission, an RV identifier corresponding to each actual transmission corresponding to the nominal transmission. For each nominal transmission, RV identifiers corresponding to all actual transmissions corresponding to the nominal transmission are an RV identifier corresponding to the nominal transmission. In this way, a solution of determining an RV identifier corresponding to an actual transmission can be improved, and an RV to be transmitted is no longer randomly selected.

In an implementation, that the terminal device determines an RV identifier corresponding to each of the E nominal transmissions includes: when a first sorting relationship exists between a plurality of RV identifiers corresponding to PUSCH transmission, sequentially and cyclically mapping the plurality of RV identifiers to all nominal transmissions based on an RV identifier indicated by downlink control information and the first sorting relationship. In this way, when a quantity of transmissions is relatively large, RVs may be traversed, so that the reliability of data transmission can be improved.

In an implementation, that the terminal device determines an RV identifier corresponding to each of the E nominal transmissions includes: for a nominal transmission corresponding to an indicated first SRS resource, sequentially and cyclically mapping, based on an RV identifier indicated by downlink control information and a second sorting relationship, a plurality of RV identifiers to nominal transmissions corresponding to the SRS resource, where there is a difference of an offset value between an RV identifier of each nominal transmission corresponding to an $(i+1)^{th}$ SRS resource and an RV identifier of each nominal transmission corresponding to an $i^{th}$ SRS resource. This can improve the flexibility of the solution. In addition, there is an offset value between RV sortings corresponding to SRS resources, that is, RV identifiers corresponding to the first nominal transmission corresponding to two adjacent SRS resources may be different, so that the reliability of data transmission can be further improved.

In an implementation, the first sorting relationship between a plurality of RVs includes: RV 0-RV 2-RV 3-RV 1, RV 0-RV 3-RV 0-RV 3, or RV 0-RV 0.

In an implementation, a second sorting relationship corresponding to the first SRS resource in the L SRS resources is the same as the first sorting relationship. In an implementation, a second sorting relationship corresponding to an $(i+1)^{th}$ SRS resource in the L SRS resources is: a second sorting relationship corresponding to an $i^{th}$ SRS resource plus a preset offset. i is a positive integer. There is an offset value between RV sortings corresponding to SRS resources, that is, RV identifiers corresponding to the first nominal transmissions corresponding to two adjacent SRS resources may be different, so that the reliability of data transmission can be further improved.

In an implementation, the Q PUSCH transmissions include a first PUSCH transmission and a second PUSCH transmission, the first PUSCH transmission and the second PUSCH transmission are any two adjacent transmissions in a plurality of transmissions corresponding to a same SRS resource, and a frequency domain start position corresponding to the first PUSCH transmission is different from a frequency domain start position corresponding to the second PUSCH transmission. Because frequency hopping transmission is used, the reliability of data transmission can be further improved.

According to a second aspect, this application provides a data transmission method. The method may be performed by a network device, or may be performed by a chip disposed inside the network device. For ease of description, an example in which the network device is used as an execution body is used for description in this application. In the data transmission method, the network device sends first information to a terminal device, where the first information is used to indicate L SRS resources, L is an integer greater than 1, and at least two of the L SRS resources correspond to different spatial relations; and the network device receives Q PUSCH transmissions sent by the terminal device by using the L SRS resources, where Q is an integer greater than 1. At least two of a plurality of SRS resources correspond to different spatial relations. In this case, PUSCH repetition transmission is performed by using the plurality of SRS resources, that is, PUSCH repetition transmission is performed based on a plurality of beams, so that reliability of the transmission can be improved.

In an implementation, a field value of a first field of the first information is used to indicate the L SRS resources. A preset correspondence between a field value and an SRS resource satisfies the following content: one field value is used to indicate one or more SRS resources, and when one field value is used to indicate a plurality of SRS resources, any two of the plurality of SRS resources correspond to different spatial relations. In this case, a plurality of SRS resources that are indicated by the network device and that have different spatial relations may be determined based on the field value of the first field, and the manner of indicating the plurality of resources is simple and easy to implement.

In an implementation, SRS resources with a same spatial relation in K SRS resources configured by the network device for the terminal device are in one resource group, and the K SRS resources include a plurality of resource groups; the L SRS resources correspond to L resource groups in the plurality of resource groups; and any two of the L SRS resources correspond to different resource groups. SRS resources are grouped based on spatial relations, so that during indication, one SRS resource may be selected from each group and indicated to the terminal device, so that a plurality of beams are indicated to the terminal device. This solution is simple and easy to implement.

In an implementation, the preset correspondence between a field value and an SRS resource satisfies the following content: one field value is used to indicate one or more of the K SRS resources, and when one field value is used to indicate a plurality of SRS resources, any two of the plurality of SRS resources correspond to different resource groups. In this case, when one field value is used to indicate a plurality of SRS resources, where the plurality of SRS resources are from different resource groups, resource combination forms can be reduced. For example, one field value may be filtered out to indicate a form of a plurality of SRS resources from a same group, so that fewer field values need to be set.

Corresponding to any method for determining a spatial relation for uplink transmission performed by a terminal device in the first aspect and the second aspect, this application further provides a communication device. The communication device may be any transmit end device or any receive end device that transmits data in a wireless manner. For example, the communication device may be a communication chip, a terminal device, or a network device (for example, a base station). In a communication process, a transmit end device and a receive end device are opposite to each other. In some communication processes, the communication device may be used as the foregoing network device or a communication chip that may be used in the network device. In some communication processes, the communication device may be used as the foregoing terminal device or a communication chip that may be used in the terminal device.

According to a third aspect, a communication device is provided. The communication device includes a transceiver unit and a processing unit, to perform any implementation of any communication method according to the first aspect and the second aspect. The transceiver unit is configured to perform functions related to sending and receiving. Optionally, the transceiver unit includes a receiving unit and a sending unit. In a design, the communication device is a communication chip, and the transceiver unit may be an input/output circuit or a port of the communication chip.

In another design, the transceiver unit may be a transmitter and a receiver, or the transceiver unit may be a transmitting machine and a receiving machine.

Optionally, the communication device further includes modules that may be configured to perform any implementation of any communication method according to the first aspect and the second aspect.

According to a fourth aspect, a communication device is provided. The communication device is the terminal device or the network device. The communication device includes a processor and a memory. The memory is configured to store program code. The processor is configured to invoke the program code from the memory to perform the method according to the first aspect or the second aspect.

According to a fifth aspect, this application provides a communication device. The communication device includes a processor, a memory, and a transceiver. The transceiver is configured to receive a signal or send a signal. The memory is configured to store program code. The processor is configured to invoke the program code from the memory to perform the method in the first aspect or the second aspect. The memory is configured to store a computer program or instructions. The processor is configured to invoke the computer program or the instructions from the memory and run the computer program or the instructions. When the processor executes the computer program or the instructions in the memory, the communication device is enabled to perform any implementation of the communication method in either of the first aspect and the second aspect.

Optionally, there are one or more processors, and there are one or more memories.

Optionally, the memory may be integrated with the processor, or the memory and the processor are disposed separately.

Optionally, the transceiver may include a transmitter and a receiver.

According to a sixth aspect, a communication device is provided. The communication device includes a processor. Optionally, the processor is coupled to a memory, and may be configured to perform the method according to either of the first aspect and the second aspect and any one of the implementations of the first aspect and the second aspect. Optionally, the communication device further includes the memory. Optionally, the communication device further includes a communication interface, and the processor is coupled to the communication interface.

In an implementation, the communication device is a terminal device. When the communication device is a terminal device, the communication interface may be a transceiver or an input/output interface. Optionally, the transceiver may be a transceiver circuit. Optionally, the input/output interface may be an input/output circuit.

In another implementation, the communication device is a network device. When the communication device is a network device, the communication interface may be a transceiver or an input/output interface. Optionally, the transceiver may be a transceiver circuit. Optionally, the input/output interface may be an input/output circuit.

In another implementation, the communication device is a chip or a chip system. When the communication device is a chip or a chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a seventh aspect, this application provides a communication device. The communication device includes a processor and an interface circuit. The interface circuit is configured to receive code instructions and transmit the code instructions to the processor. The processor runs the code instructions to perform the corresponding method shown in the first aspect or the second aspect.

According to an eighth aspect, a system is provided. The system includes the foregoing terminal device and the foregoing network device.

According to a ninth aspect, a computer program product is provided. The computer program product includes a computer program (which may also be referred to as code or instructions). When the computer program is run, a computer is enabled to perform the method according to any implementation of the first aspect, or the computer is enabled to perform the method according to any implementation of the first aspect and the second aspect.

According to a tenth aspect, a computer-readable storage medium is provided. The computer-readable storage medium stores a computer program (which may also be referred to as code or instructions). When the computer program is run on a computer, the computer is enabled to perform the method according to any implementation of the first aspect, or perform the method according to any implementation of the first aspect and the second aspect.

According to an eleventh aspect, a communication device is provided. The communication device includes an input circuit, an output circuit, and a processing circuit. The processing circuit is configured to receive a signal by using the input circuit, and transmit a signal by using the output circuit, so that the method in either of the first aspect and the second aspect and any one of the implementations of the first aspect and the second aspect is implemented.

In a implementation process, the processing device may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver; a signal output by the output circuit may be output to, for example, but not limited to, a transmitter and transmitted by the transmitter. The input circuit and the output circuit may be a same circuit, and the circuit is used as the input circuit and the output circuit at different moments. An implementation of the processor and various circuits is not limited in this application.

DESCRIPTION OF EMBODIMENTS

A person of ordinary skill in the art may be aware that, in combination with illustrative logical blocks described in embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

Figure 1:
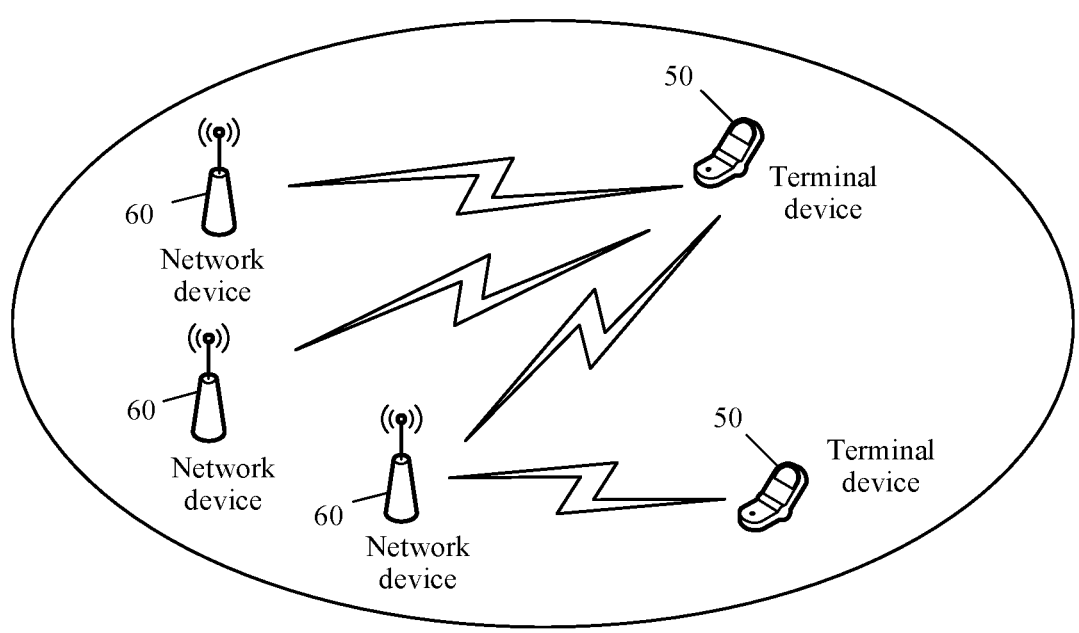
FIG. 1 is a diagram of a system architecture to which an embodiment of this application is applicable.

FIG. 1 is a diagram of a system architecture to which an embodiment of this application is applicable. The system architecture shown in FIG. 1 includes a network device and a terminal device. A single network device may transmit data or control signaling to a single terminal device or a plurality of terminal devices. Alternatively, a plurality of network devices may transmit data or control signaling to a single terminal device. It should be understood that, a quantity of network devices and a quantity of terminal devices in the system architecture are not limited in embodiments of this application. Moreover, in addition to the network device and the terminal device, the system architecture to which the embodiments of this application are applicable may further include other devices such as a core network device, a wireless relay device, and a wireless backhaul device. This is not limited in the embodiments of this application either. In addition, the network device in the embodiments of this application may integrate all functions into one independent physical device, or may distribute the functions on a plurality of independent physical devices. This is not limited in the embodiments of this application either. In addition, the terminal device in the embodiments of this application may be connected to the network device in a wireless manner.

The technical solutions of embodiments of this application may be applied to various communication systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, and a 5G communication system.

In the system architecture shown in FIG. 1, transmission performed by the terminal device towards the network device may be referred to as uplink transmission. Transmission performed by the network device towards the terminal device may be referred to as downlink transmission. The uplink transmission may include transmission of a physical uplink control channel (PUCCH), a physical uplink shared channel (PUSCH), an SRS, and the like.

In embodiments of this application, the uplink transmission may be performed by using a single beam, or may be performed by using a plurality of beams. For example, in multi-beam-based or multi-station-based downlink transmission, the network device transmits downlink data to the terminal device by using a plurality of beams, and the terminal device receives the downlink data by using a plurality of receive beams. On the contrary, the terminal device sends uplink data to the network device by using a plurality of transmit beams, and the network device correspondingly receives, by using a plurality of beams, the uplink data transmitted by the terminal device.

The following describes terms and related technologies in the embodiments of this application.

(1) Terminal Device

The terminal device may include various handheld devices, vehicle-mounted devices, wearable devices, or computing devices that have a wireless communication function, or other processing devices connected to a wireless modem. The terminal may be a mobile station (MS), a subscriber unit, a cellular phone, a smartphone, a wireless data card, a personal digital assistant (PDA for short) computer, a tablet computer, a wireless modem, a handheld device (handset), a laptop computer, a machine type communication (MTC) terminal, or the like.

(2) Network Device

The network device may be a device that is deployed in a radio access network and that provides a wireless communication function for the terminal device. The network device may include a macro base station, a micro base station (also referred to as a small cell), a relay node, an access point, and the like in various forms. In systems using different radio access technologies, names of the network device may be different, for example, a base transceiver station (BTS) in a global system for mobile communications (GSM) or a code division multiple access (CDMA) network, an NB (NodeB) in wideband code division multiple access (WCDMA), and an eNB or an eNodeB (evolved NodeB) in long term evolution (LTE). Alternatively, the network device may be a radio controller in a cloud radio access network (CRAN) scenario. The network device may alternatively be a base station device in a future 5G network or a network device in a future evolved public land mobile network (PLMN) network. The network device may alternatively be a wearable device or a vehicle-mounted device. The network device may alternatively be a transmission reception point (TRP). This is not limited in embodiments of this application.

(3) Beam

A beam may be embodied as a spatial domain filter in a new radio (New Radio, NR) protocol, or referred to as a spatial filter, a spatial domain parameter, a spatial parameter, a spatial domain setting, a spatial setting, QCL (quasi-colocation) information, a QCL assumption, a QCL indication, or the like. The beam may be indicated by a transmission configuration indication state (TCI-state) parameter or a spatial relation parameter. Therefore, in this application, a beam may be replaced with a spatial domain filter, a spatial filter, a spatial domain parameter, a spatial parameter, a spatial domain setting, a spatial setting, QCL information, a QCL assumption, a QCL indication, a TCI-state (a downlink (DL) TCI-state and an uplink (UL) TCI-state), a spatial relation, or the like. The foregoing terms are equivalent to each other. For example, the spatial relation in embodiments of this application may also be replaced with the TCI-state or the beam. The beam may alternatively be replaced with another term representing a beam. This is not limited in this application.

A beam used to send a signal may be referred to as a transmit beam (Tx beam), a spatial domain transmit filter, a spatial transmit filter, a spatial domain transmit parameter, a spatial transmit parameter, a spatial domain transmit setting, or a spatial transmit setting. The downlink transmit beam may be indicated by using the TCI-state.

A beam used to receive a signal may be referred to as a receive beam (Rx beam), a spatial domain receive filter, a spatial receive filter, a spatial domain receive parameter, a spatial receive parameter, a spatial domain receive setting, or a spatial receive setting. The uplink transmit beam may be indicated by using the spatial relation, the uplink TCI-state, or an SRS resource. Therefore, an uplink beam may also be replaced with an SRS resource.

The transmit beam may refer to distribution of signal strength formed in different directions in space after a signal is transmitted through an antenna, and the receive beam may refer to distribution of signal strength, in different directions in space, of a radio signal received from an antenna.

In addition, the beam may be a wide beam, a narrow beam, or a beam of another type. A technology for forming the beam may be a beamforming technology or another technology. The beamforming technology may be a digital beamforming technology, an analog beamforming technology, a hybrid digital/analog beamforming technology, or the like For ease of description, the spatial relation is mainly used as an example for description in embodiments of this application. In embodiments of this application, a beam may be replaced with a noun that can represent the beam, such as a resource, a TCI-state, a spatial relation, a spatial parameter, or a spatial domain filter.

A beam usually corresponds to a resource. For example, during beam measurement, the network device measures different beams by using different resources, the terminal device feeds back measured resource quality, and the network device may determine corresponding beam quality based on the resource quality fed back by the terminal device. For data transmission, beam information may be indicated by using a resource corresponding to a beam. For example, the network device may indicate PDSCH beam information to the terminal device by using a TCI field in downlink control information (DCI).

Optionally, a plurality of beams that have a same communication feature or similar communication features are considered as one beam. One beam may include one or more antenna ports, configured to transmit a data channel, a control channel, a sounding signal, and the like. The one or more antenna ports forming the beam may also be considered as one antenna port set.

In embodiments of this application, during beam measurement, each beam of the network device may correspond to one resource. Therefore, an index of the resource may be used to identify a beam corresponding to the resource.

(4) Spatial Relation

In 3GPP Release 15, an uplink transmit beam is indicated by using a spatial relation. In embodiments of this application, an example in which a beam is indicated by using a spatial relation is used for description.

The spatial relation may include an index of an SRS resource, indicating that a transmit beam of the SRS resource is used for uplink transmission. For example, if a spatial relation used by a PUCCH includes SRS resource #1, it indicates that a transmit beam of the PUCCH is the same as that of SRS resource #1. In this case, the terminal device sends the PUCCH by using the transmit beam of SRS resource #1.

Alternatively, the spatial relation may include a downlink reference signal resource, for example, a synchronization signal block (SSB) or a channel state information reference signal (CSI-RS), indicating that a receive beam of the downlink reference signal resource is used for uplink transmission. For example, if a spatial relation used by a PUCCH includes CSI-RS resource #1, it indicates that a transmit beam of the PUCCH is the same as a receive beam of CSI-RS resource #1. In this case, the terminal device sends the PUCCH by using the receive beam of CSI-RS resource #1.

(5) Resource

During beam measurement, a beam corresponding to a resource may be identified by using an index of the resource.

The resource may be an uplink signal resource, or may be a downlink signal resource. An uplink signal includes but is not limited to a sounding reference signal (SRS) and a DMRS. A downlink signal includes but is not limited to: a CSI-RS, a cell-specific reference signal (CS-RS), a UE-specific reference signal (US-RS), a demodulation reference signal (DMRS), and a synchronization signal/physical broadcast channel block (SS/PBCH block). The SS/PBCH block may be referred to as an SSB for short.

The resource is configured by using RRC signaling. In a configuration structure, a resource is a data structure, including a related parameter of an uplink/downlink signal corresponding to the resource, for example, a type of the uplink/downlink signal, a resource element that carries the uplink/downlink signal, sending time and a sending periodicity of the uplink/downlink signal, and a quantity of ports used to send the uplink/downlink signal. Each resource of the uplink/downlink signal has an index, to identify the resource of the downlink signal. It may be understood that the index of the resource may also be referred to as an identifier of the resource. This is not limited in embodiments of this application.

(6) SRS Resource

The SRS resource may be a reference signal resource sent by the terminal device to the network device, and may be used to measure an uplink channel. Based on different usage, SRS resources are classified into four types: an SRS resource used for uplink beam management, an SRS resource used for codebook-based uplink transmission, an SRS resource used for non-codebook-based uplink transmission, and an SRS resource used for antenna switching channel measurement.

The network device may configure a plurality of SRS resource sets for the terminal device. Each SRS resource set includes one parameter. The parameter is usage. The parameter, namely, usage, has four values: beamManagement, codebook, nonCodebook, antennaSwitching. An SRS resource included in an SRS resource set whose usage is beamManagement is the SRS resource used for uplink beam management, an SRS resource included in an SRS resource set whose usage is codebook is the SRS resource used for codebook-based uplink transmission, an SRS resource included in an SRS resource set whose usage is nonCodebook is the SRS resource used for non-codebook-based uplink transmission, and an SRS resource included in an SRS resource set whose usage is antenna Switching is the SRS resource used for antenna switching channel measurement.

(7) SRS Resource Whose Usage is Beam Management

Each SRS resource or each port of the SRS resource may be used to measure one beam. The terminal device may send, by using one beam, a reference signal corresponding to one SRS resource or one port of the SRS resource, and the network device may determine quality of each uplink transmit beam by measuring quality of the reference signal corresponding to each SRS resource/port, to implement uplink beam management.

(8) SRS Resource Whose Usage is Codebook-Based

Uplink data (for example, a PUSCH) transmission may be classified into two modes: codebook-based transmission and non-codebook-based transmission.

In codebook-based PUSCH transmission, an optimal codebook (precoding matrix) for PUSCH transmission needs to be determined by using an SRS resource whose usage is codebook. A procedure is as follows:

The terminal device sends an SRS resource whose usage is codebook to the network device, and the network device measures the SRS resource and calculates an optimal codebook (where a codebook is a precoding matrix) for PUSCH transmission.

The network device indicates the optimal codebook to the terminal device by using DCI (downlink control information).

The terminal device performs PUSCH transmission by using the codebook.

(9) SRS Resource Whose Usage is Non-Codebook-Based

In non-codebook-based PUSCH transmission, an optimal codebook (precoding matrix) for PUSCH transmission needs to be determined by using an SRS resource whose usage is nonCodebook. A procedure is as follows:

Each SRS resource set whose usage is nonCodebook is associated with a downlink CSI-RS resource. The terminal device measures the CSI-RS resource to determine a downlink channel.

The terminal device infers an uplink channel based on uplink and downlink channel reciprocity, and determines K precoding matrices with good performance.

For each precoding matrix, the UE sends a group of SRS resources to the network device. Each group of SRS resources are precoded by using one of the foregoing K precoding matrices.

The network device measures each group of SRSs, determines an optimal group of SRSs, and indicates the group of SRSs to the terminal device by using DCI.

The terminal device determines the optimal group of SRSs, determines an optimal precoding matrix, and performs PUSCH transmission by using the precoding matrix.

(10) SRS Resource Whose Usage is antennaSwitching

The terminal device may send SRSs to the network device by using all antennas, so that the network device measures channel information between all antennas of the network device and all the antennas of the terminal. However, due to a power limitation, some terminal devices may send SRS signals by using some uplink antennas at a time, and the network device can measure channel information corresponding to all the antennas of the UE only after SRS signals are sent for a plurality of times (where a different antenna is used each time). An SRS resource whose usage is antennaSwitching is an SRS resource specially used for this type of measurement.

(11) Others.

The terms "system" and "network" may be used interchangeably in embodiments of this application. "At least one" means one or more, and "a plurality of" means two or more. And/or describes an association relationship between associated objects, and represents that three relationships may exist. For example, A and/or B may represent the following cases: Only A exists, both A and B exist, and only B exists, where A and B may be singular or plural. The character "/" generally represents an "or" relationship between the associated objects. At least one of the following items (pieces) or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

In addition, unless otherwise stated, ordinal numbers such as "first" and "second" in embodiments of this application are used to distinguish between a plurality of objects, and are not used to limit an order, a time sequence, priorities, or importance of the plurality of objects.

Figure 2:
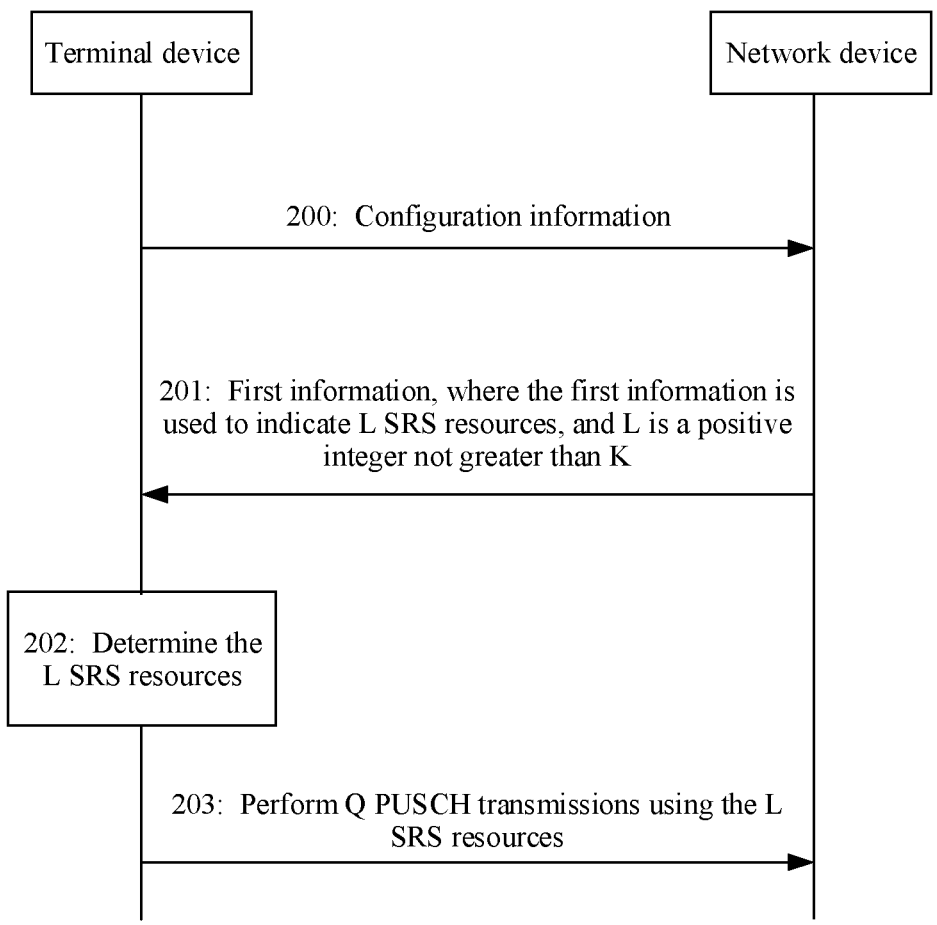
FIG. 2 is a flowchart of a data transmission method according to an embodiment of this application.

Based on the foregoing content, FIG. 2 shows a flowchart of an example of a method for determining a spatial relation for uplink transmission performed by a terminal device. As shown in FIG. 2, the method includes the following steps.

Step 200: A network device sends configuration information to the terminal device. The configuration information is used to indicate K SRS resources, and K is a positive integer.

In an optional implementation, the configuration information may include a parameter related to PUSCH transmission. For example, the configuration information may include one or more SRS resource sets configured by the network device for the terminal device (for example, one or more SRS resource sets whose usage is codebook may be configured, or one or more SRS resource sets whose usage is nonCodebook may be configured), and each resource set includes one or more SRS resources. In this embodiment of this application, an example in which the resource set configured by the network device for the terminal device includes the K SRS resources is used for description.

Step 201: The network device sends first information to the terminal device, where the first information is used to indicate L SRS resources, and L is a positive integer not greater than K.

Step 202: The terminal device determines the L SRS resources.

Step 203: The terminal device performs Q PUSCH transmissions by using the L SRS resources, where Q is a positive integer.

The terminal device may perform one PUSCH transmission, or may perform a plurality of PUSCH transmissions. If the terminal device performs a plurality of PUSCH transmissions (where Q is an integer greater than 1), but same data is transmitted during the plurality of PUSCH transmissions, for example, a same data transport block (TB) corresponds to a same RV or different RVs, it may also be referred to as that the terminal device performs PUSCH repetition transmission. A plurality of PUSCH transmissions may alternatively be used to transmit different data, for example, different data streams. In an optional implementation, L is an integer greater than 1, Q is an integer greater than 1, and at least two of the L SRS resources correspond to different spatial relations. In this embodiment of this application, the spatial relation may be replaced with a beam. In this implementation, it may also be described as that at least two of the L SRS resources correspond to different beams. In this case, the terminal device performs the Q PUSCH transmissions by using the L SRS resources, because compared with a solution in which PUSCH repetition transmission is performed by using only one beam, the solution in which PUSCH repetition transmission is performed by using two SRS resources of different beams can improve reliability of data transmission.

In still another optional implementation, L is an integer greater than 1, Q is an integer greater than 1, and any two of the L SRS resources correspond to different spatial relations. In this case, when the terminal device performs the Q PUSCH repetition transmissions by using the L SRS resources, because any two of the used L SRS resources correspond to different spatial relations, the reliability of data transmission can be further improved.

In step 201, the network device indicates an SRS resource, for example, the network device may indicate one or more beams/spatial relations/TCI-states/pieces of QCL information/SRS resources. In an optional implementation, the network device may indicate indexes of the beams/spatial relations/TCI-states/pieces of QCL information/SRS resources. In still another optional implementation, the network device may first group the beams/spatial relations/TCI-states/pieces of QCL information/SRS resources, and then indicate one group. The grouping may be indicated by using RRC/media access control element (MAC CE)/DCI signaling. "/" in this embodiment of this application means "or". In this embodiment of this application, "beam/spatial relation/TCI-state/QCL information/SRS resource" indicates at least one of "beam", "spatial relation", "TCI-state", "QCL information", and "SRS resource".

The following describes, by using resource indication manner a1, resource indication manner a2, resource indication manner a3, resource indication manner a4, and resource indication manner a5, how to indicate the SRS resource by using downlink control information (DCI). In other words, an example in which the first information is the DCI is used for description.

The following method may also be extended to RRC/MAC CE signaling. The first information may also be RRC signaling or MAC signaling. In the following method for indicating the SRS resource, the DCI may be replaced with RRC or a MAC CE. The following method may also be extended to an indication of a beam/spatial relation/TCI-state/piece of QCL information, and an SRS resource may be replaced with a "beam", a "spatial relation", a "TCI-state", or a piece of "QCL information".

In the following resource indication manners a1 to a5, in an optional implementation, the SRS resource may be indicated by using one or more fields in the DCI. In this embodiment of this application, the one or more fields used to indicate the SRS resource are collectively referred to as a first field. A field value of the first field may be used to indicate one or more SRS resources in the K SRS resources, or a field value of the first field is used to indicate the K SRS resources, that is, indicate a universal set of the K SRS resources. Correspondingly, the terminal device may determine, based on the field value of the first field in the first information and a correspondence between a field value and an SRS resource, the L SRS resources indicated by the field value of the first field.

In an optional implementation, an uplink transmission mode suitable for this embodiment of this application may be a combination of any one or more of the following: codebook-based uplink transmission (that is, the uplink transmission mode is configured as codebook, and the uplink transmission mode configuration may be written as txConfig in English), non-codebook-based uplink transmission (that is, the uplink transmission mode is configured as nonCodebook), uplink full power transmit mode 1 (that is, the uplink full power transmit mode is configured as Mode 1), uplink full power transmit mode 2 (that is, the uplink full power transmit mode is configured as Mode 2), and non-full-power uplink transmission (that is, the uplink full power transmit mode is not configured).

One of the following resource indication manners a1 to a5 may be flexibly applied to various uplink transmission modes. For example, when the uplink transmission mode is uplink full power transmit mode 2 (where the uplink full power transmit mode ULFPTxModes is configured as Mode 2), resource indication manner a3 is used to indicate the SRS resource. For another example, when the uplink transmission mode is codebook-based uplink transmission, resource indication manner a3 is used to indicate the SRS resource. For another example, when the uplink transmission mode is uplink full power transmit mode 1 or non-full-power uplink transmission (that is, ULFPTxModes is not configured or is configured as Mode 1), resource indication manner a1 may be used to indicate the SRS resource.

Resource Indication Manner a1

In this embodiment of this application, the configuration information in step 200 may be RRC signaling. The network device configures a resource set for the terminal device by using the RRC signaling. The resource set may include K SRS resources, where K is a positive integer, for example, K=2 or K=4.

In resource indication manner a1, the first field may be used to indicate a single SRS resource in the SRS resource set, or may be used to indicate all SRS resources. In an optional implementation, the first field may include an SRS resource indicator field in the downlink control information. For example, as shown in Table 1, the SRS resource set includes K=2 SRS resources (for example, the K SRS resources are SRS 0 and SRS 1). Three field values of the first field may respectively indicate SRS 0, SRS 1, and SRS 0+SRS 1.

TABLE 1

| Field value | Indicated SRS resource |
|---|---|
| 0 | SRS 0 |
| 1 | SRS 1 |
| 2 or 3 | SRS 0 + SRS 1 |

In resource indication manner a1, a length of the first field is equal to $\lceil \log_2 K \rceil$ or $\lceil \log_2 K \rceil + 1$. For example, when K=2, the length of the first field is $\lceil \log_2 K \rceil + 1 = 2$ bits. For another example, when K=3, the length of the first field is $\lceil \log_2 K \rceil = 2$ bits. A calculation manner to be used may alternatively be determined based on a value of K. For example, calculation formulas for different field lengths may be determined based on whether $\log_2 K$ is an integer. For example, if $\log_2 K$ is an integer, $\lceil \log_2 K \rceil + 1$ is used as the length of the first field. If $\log_2 K$ is not an integer, $\lceil \log_2 K \rceil$ is used as the length of the first field. Optionally, the length of the first field may alternatively be determined by using another formula, for example, $\lceil \log_2 K \rceil - 1$ and $\lceil \log_2 K \rceil + 2$. Optionally, it may be specified that a maximum/minimum field value is used to indicate that all SRSs are used.

Resource Indication Manner a2

In resource indication manner a2, in an optional implementation, the first field may include an SRS resource indicator field in the downlink control information. The first field may be used to indicate a single SRS resource and a plurality of SRS resources (that is, an SRS combination) in the SRS resource set. The SRS combination that may be indicated by the first field may be any combination of the K SRS resources (including the universal set including all the SRSs). For example, the SRS resource set includes K=3 SRS resources that are respectively SRS 0, SRS 1, and SRS 2, and corresponds to a total of four combinations: {SRS 0, SRS 1}, {SRS 0, SRS 2}, {SRS 1, SRS 2}, and {SRS 0, SRS 1, SRS 2}.

In resource indication manner a2, an SRS combination that may be indicated by the field value of the first field may be some combinations of the K SRS resources. For example, the combinations are combinations excluding the universal set including all the SRSs (that is, excluding {SRS 0, SRS 1, SRS 2} in the foregoing example), or excluding a combination of some non-universal sets, for example, {SRS 0, SRS 1}, or excluding the universal set and a combination of some non-universal sets, for example, {SRS 0, SRS 1} and {SRS 0, SRS 1, SRS 2}.

In resource indication manner a2, the length of the first field is equal to $\lceil \log_2 N \rceil$. N is the quantity K of the SRS resources in the SRS resource set plus a quantity of combinations that can be indicated. Alternatively, N may be equal to K. In this case, the first field may indicate a single SRS resource. Alternatively, N may be equal to a quantity of combinations that can be indicated. In this case, the first field may indicate a plurality of SRSs, but does not indicate a single SRS resource.

In resource indication manner a2, the first field may also be used to indicate whether all the SRS resources are used. For example, the first field may further include a new data indicator field. The new data indicator may be written as a new data field. This field has a length of 1 bit, and may be used to indicate whether a plurality of SRS resources are used for PUSCH transmission. When it is indicated that all the SRSs are used, the length of the SRS resource indicator field in the DCI is 0, that is, the field is not required. Alternatively, when it is indicated that all the SRSs are used, the length of the SRS resource indicator field in the DCI is not 0. In this case, an SRS resource indicated by the field is used to indicate that all SRS resources in an SRS resource set in which the SRS resource is located are used. Alternatively, when it is indicated that all SRSs are used, the length of the SRS resource indicator field in the DCI is not 0. In this case, the field is used to indicate an SRS resource set, and indicates that all SRS resources in the SRS resource set are used. The new data indicator field may alternatively be replaced with another field, for example, may be replaced with any one of the following fields: Identifier for DCI formats, Carrier indicator, UL/SUL indicator, Bandwidth part indicator, Frequency domain resource assignment, Time domain resource assignment, Frequency hopping flag, Modulation and coding scheme, Redundancy version, HARQ process number, TPC, Precoding information and number of layers, Antenna ports, SRS request, CSI request, CBG transmission information (CBGTI), PTRS-DMRS association, beta offset indicator, DMRS sequence initialization, and UL-SCH indicator.

Resource Indication Manner A3

In resource indication manner a3, the preset correspondence between a field value and an SRS resource satisfies the following: one field value is used to indicate one or more SRS resources, and when one field value is used to indicate a plurality of SRS resources, any two of the plurality of SRS resources correspond to different spatial relations.

In resource indication manner a3, in an optional implementation, SRS resources with a same spatial relation in the K SRS resources configured by the network device for the terminal device are in one resource group, and the K SRS resources include a plurality of resource groups. The L SRS resources correspond to L resource groups in a plurality of resource groups, and any two of the L SRS resources correspond to different resource groups. In this implementation, the preset correspondence between a field value and an SRS resource may alternatively satisfy the following: one field value is used to indicate one or more of the K SRS resources, and when one field value is used to indicate a plurality of SRS resources, any two of the plurality of SRS resources correspond to different resource groups.

In resource indication manner a3, the K SRS resources may be grouped into a plurality of groups, for example, two groups. The grouping may be performed based on a beam configuration of an SRS resource, for example, a spatial relation configuration. SRSs with a same beam/spatial relation are grouped into one group. A beam/spatial relation is configured for each SRS resource in the SRS resource set, and a total of B different spatial relations are configured for all SRS resources. All the SRS resources may be grouped into B groups. A first group includes K1 SRS resources, a second group includes K2 SRS resources, and an $r^{th}$ group includes K1 SRS resources. A value of r may start from 1, and r is a positive integer. In this case, counting is performed starting from the first group. In another implementation, counting may alternatively be performed starting from a $0^{th}$ group. In other words, in this case, a value of r is 0 and a positive integer. Optionally, it may be specified that quantities of SRS resources included in all groups of SRS resources are equal, for example, the quantities are all equal to 1 or equal to 2. Each group of SRS resources have a same beam/spatial relation, and different groups of SRS resources have different beams/spatial relations. The following describes an example in which the K SRS resources are grouped into two groups. However, the following method is also applicable to another case in which a quantity of groups is not 2, provided that the quantity of groups is replaced.

In resource indication manner a3, in an optional implementation, the first field may include an SRS resource indicator field in the downlink control information. The first field may be used to indicate a single SRS resource and/or a plurality of SRS resources in the SRS resource set. The plurality of SRS resources may also be referred to as an SRS combination. The plurality of SRS resources may be selected from the foregoing groups of SRS resources. For example, one SRS resource is selected from each group of SRS resources to form the SRS combination. Alternatively, two SRS resources are selected from each group of SRS resources to form the SRS combination. Alternatively, the plurality of resources may be a plurality of resources selected from a same group of SRS resources. Optionally, SRS resources in the SRS combination have a same quantity of ports. The first field may indicate a single SRS resource. In this case, a length of the field is $\lceil \log_2(M) \rceil$ bits. M is a quantity of SRS resources in the SRS resource set, and a value of M is a positive integer. The first field may indicate an SRS combination. In this case, a length of the field is $\lceil \log_2 N \rceil$ bits. N is a quantity of all SRS combinations. For example, one SRS resource is selected from each group of SRS resources to form one SRS combination, and there are a total of $\Pi_{i=1}^{X}$ Ki combinations. In this case, $N = \Pi_{i=1}^{X}$ Ki. For example, if there are a total of two groups, N=K1*K2. The first field may alternatively indicate a single SRS resource and a plurality of SRS resources. Some field values indicate a single SRS resource, and some field values indicate a plurality of SRS resources. In this case, a length of the first field is $\Pi_{i=1}^{X}$ Ki. Optionally, the foregoing method may be performed when a condition is satisfied. For example, the foregoing method is used to indicate a plurality of SRS resources or indicate a single SRS resource and a plurality of SRS resources only when spatial relations configured for SRS resources included in an SRS resource set whose usage is configured as codebook are not completely the same. If spatial relations configured for all the SRS resources are the same, the foregoing method may be used to indicate a single SRS resource. Optionally, in this case, the length of the field is $\lceil \log_2(M) \rceil$ bits.

The following describes the correspondence between the field value of the first field and the SRS resource in resource indication manner a3 by using example 1 of resource indication manner a3, example 2 of resource indication manner a3, example 3 of resource indication manner a3, and example 4 of resource indication manner a3.

Example 1 of Resource Indication Manner a3

A total of four SRS resources: SRS 0, SRS 1, SRS 2, and SRS 3, are configured in the SRS resource set. The four SRSs are grouped into two groups. A first group of SRS resources are SRS 0 and SRS 1, and a second group of SRS resources are SRS 2 and SRS 3. In this case, the length of the first field is three bits, and Table 2 may be used to indicate an SRS resource. It can be learned that when one field value is used to indicate a plurality of SRS resources, any two of the plurality of SRS resources correspond to different resource groups.

TABLE 2

| Field value | SRS resource |
| --- | --- |
| 0 | SRS 0 |
| 1 | SRS 1 |
| 2 | SRS 2 |
| 3 | SRS 3 |
| 4 | SRS 0 + SRS 2 |
| 5 | SRS 0 + SRS 3 |
| 6 | SRS 1 + SRS 2 |
| 7 | SRS 1 + SRS 3 |

Example 2 of Resource Indication Manner a3

A total of two SRS resources: SRS 0 and SRS 1, are configured in the SRS resource set. The two SRSs are grouped into two groups. A first group of SRS resources are SRS 0, and a second group of SRS resources are SRS 1. In this case, the length of the first field is three bits, and Table 3 may be used to indicate an SRS resource.

TABLE 3

| Field value | SRS resource |
| --- | --- |
| 0 | SRS 0 |
| 1 | SRS 1 |
| 2 | SRS 0 + SRS 1 |

Example 3 of Resource Indication Manner a3

A total of three SRS resources: SRS 0, SRS 1, and SRS 2, are configured in the SRS resource set. The three SRSs are grouped into two groups. A first group of SRS resources are SRS 0, and a second group of SRS resources are SRS 1 and SRS 2. In this case, the length of the first field is three bits, and Table 4 may be used to indicate an SRS resource.

TABLE 4

| Field value | SRS resource |
| --- | --- |
| 0 | SRS 0 |
| 1 | SRS 1 |
| 2 | SRS 2 |
| 3 | SRS 0 + SRS 1 |
| 4 | SRS 0 + SRS 2 |

Example 4 of Resource Indication Manner a3

A total of three SRS resources: SRS 0, SRS 1, and SRS 2, are configured in the SRS resource set. The three SRSs are grouped into two groups. A first group of SRS resources are SRS 0 and SRS 1, and a second group of SRS resources are SRS 2. In this case, the length of the first field is three bits, and Table 5 may be used to indicate an SRS resource.

TABLE 5

| Field value | SRS resource |
| --- | --- |
| 0 | SRS 0 |
| 1 | SRS 1 |
| 2 | SRS 2 |
| 3 | SRS 0 + SRS 2 |
| 4 | SRS 1 + SRS 2 |

Optionally, in resource indication manner a3, the B groups of SRSs may alternatively be configured by using a plurality of SRS resource sets. In other words, B SRS resource sets are configured. One SRS resource set is one group, and one SRS resource set does not need to be grouped into B groups. In this case, an SRS resource may be indicated by using the foregoing method, provided that the B groups of SRS resources in the foregoing method are replaced with B SRS resource sets. For example, one SRS resource is selected from each of a plurality of SRS resource sets to form one SRS combination. Alternatively, one or more SRS resources may be selected from a same SRS resource set to form one SRS combination. Optionally, when a single SRS resource or an SRS combination is indicated, a corresponding SRS resource set may be further indicated. The SRS resource set may alternatively be indicated by using the first field, or may be indicated by using another field.

Resource Indication Manner a4

In resource indication manner a4, a bitmap is used to indicate an SRS resource. The first field is several preset bits, and each bit corresponds to one SRS resource. A quantity of bits is equal to a quantity of configured SRS resources. For example, when codebook-based transmission is used, the quantity of bits is equal to a quantity of SRS resources in an SRS resource set whose configured usage is codebook. For another example, when non-codebook-based transmission is used, the quantity of bits is equal to a quantity of SRS resources in an SRS resource set whose usage is configured as nonCodebook. In an implementation, when a value of a bit is 1, it indicates that a corresponding SRS resource is used, or when the bit is 0, it indicates that the SRS resource is not used. In this implementation, it may also be described as that the SRS resource indicated by the network device is an SRS resource corresponding to a bit with a value of 1. In an implementation, it may also be specified that when the value of the bit is 0, it indicates that the corresponding SRS resource is used, or when the value of the bit is 1, it indicates that the corresponding SRS resource is not used. Alternatively, the first field may be partitioned into a plurality of subfields, each subfield corresponds to one SRS resource, and bit lengths of any two subfields may be equal. When a value of the subfield is 00, it may indicate that an SRS resource corresponding to the subfield is used, and another value may indicate that the SRS resource corresponding to the subfield is not used. For example, the first field includes two subfields, and each subfield corresponds to one SRS resource.

Resource Indication Manner a5

In resource indication manner a5, another parameter may be used for implicit indication. For example, when the network device indicates that the PUSCH transmission mode is multi-beam-based PUSCH repetition transmission (for example, the following transmission mode b3, transmission mode b4, transmission mode b4-A, transmission mode b4-B, transmission mode b4-C, transmission mode b5, and transmission mode b6), the terminal device determines to use all the SRS resources in the SRS resource set. In this case, the SRS resource indicator field in the DCI may be omitted, that is, the length of the field is 0.

Optionally, the plurality of SRS resources indicated by the first field belong to different cells. In other words, the plurality of SRS resources indicated by the network device for the terminal device belong to a plurality of different cells, which indicates that the terminal device transmits a PUSCH by using a plurality of cells. Each cell corresponds to one beam. The beam corresponding to each cell is a beam corresponding to the plurality of indicated SRS resources. The network device may alternatively indicate an SRS resource/beam, and each cell uses the SRS resource/beam for PUSCH transmission. The PUSCH transmitted by using a plurality of cells may be a same RV or different RVs corresponding to a same TB, may be different data streams of a same TB, or may be different TBs. Optionally, a time-frequency resource used for transmission in each cell may be determined by using one piece of downlink control information DCI. For example, if the DCI indicates that resource blocks (RB) #1 to RB #10 are used, RB #1 to RB #10 are used in each cell. Because each cell uses a different frequency, frequencies corresponding to RB #1 to RB #10 may be different. Alternatively, a time-frequency resource used for transmission in each cell may be determined based on a relationship between time-frequency resources of the cell. For example, time-frequency resources of a cell are indicated by using the DCI, and time-frequency resources of another cell are calculated by using the time-frequency resources of the cell and a preset rule. For example, time domain resources of the another cell and time domain resources of the cell satisfy an offset. A start symbol used for transmission in the another cell is a start symbol used in the cell plus an offset, or an end symbol used in the cell plus an offset. For another example, frequency domain resources of the another cell and frequency domain resources of the cell satisfy an offset. A start RB/resource block group (RBG)/resource element (Resource element, RE)/precoding resource block group (PRG) used for transmission in the another cell is a start RB/RBG/RE/PRG used in the cell plus an offset, or an end RB/RBG/RE/PRG used in the cell plus an offset. The foregoing method may also be used for downlink transmission. The network device indicates a plurality of downlink beams by using one piece of DCI, and each downlink beam corresponds to one cell. In other words, a PDSCH is transmitted in each of a plurality of cells by using a corresponding downlink beam. PDSCHs transmitted in all cells may be a same RV or different RVs corresponding to a same TB, may be different data streams of a same TB, or may be different TBs. Time-frequency resources corresponding to transmission in the cells may also be determined by using the foregoing method.

Before step 203, in an optional implementation, the terminal device may determine a transmission mode of the PUSCH transmission, and perform the PUSCH transmission based on the determined transmission mode of the PUSCH transmission. The PUSCH transmission may include a single PUSCH transmission and a plurality of PUSCH transmissions, and the plurality of PUSCH transmissions may also be referred to as a PUSCH repetition transmission in embodiments of this application. The PUSCH repetition transmission may be performed by using a single beam, or may be performed by using a plurality of beams (or in other words, the PUSCH repetition transmission performed by using a plurality of beams may also be described as multi-beam-based transmission). The PUSCH repetition transmission performed by using a plurality of beams means that at least two of PUSCH transmissions correspond to different beams. In an implementation, it may be specified that the multi-beam-based PUSCH repetition transmission can be used only when the uplink transmission mode is configured as uplink full power transmit mode (Mode 2). In still another implementation, it may be specified that the multi-beam-based PUSCH repetition transmission can be used only when the uplink transmission mode is the codebook-based transmission. The following uses transmission mode b1, transmission mode b2, transmission mode b3, transmission mode b4, transmission mode b5, and transmission mode b6 as examples to describe several transmission modes in which the terminal device performs PUSCH transmission.

Transmission Mode b1

In transmission mode b1, a single PUSCH transmission is performed based on a single beam/SRS resource/spatial relation/piece of QCL information/TCI-state. The terminal device sends a PUSCH once by using a single beam, and does not perform repetition transmission.

Transmission Mode b2

In transmission mode b2, a plurality of PUSCH transmissions are performed based on a single beam/SRS resource/spatial relation/piece of QCL information/TCI-state. This may also be described as follows: The terminal device performs a plurality of PUSCH repetition transmissions, and the plurality of PUSCH repetition transmissions are performed by using one beam. There may be a plurality of examples of transmission mode b2. The following provides descriptions by using transmission mode b2-A, transmission mode b2-B, and transmission mode b2-C as examples.

Transmission Mode b2-A

Transmission mode b2-A may mean that the PUSCH repetition transmission type is configured as PUSCH repetition type A. A same PUSCH may be repeatedly sent in continuous S1 (S1≥1) slots. The PUSCH is sent once in each slot. Optionally, time domain resources used in all slots are the same. Optionally, one data stream is transmitted in each transmission. Optionally, two of a plurality of PUSCH transmissions performed by the terminal device may correspond to a same redundancy version (RV) or different RVs of a same transport block (TB). A quantity of repetition transmissions may be indicated by using RRC/MAC CE/DCI signaling.

Transmission Mode b2-B

Transmission mode b2-B may mean that the PUSCH repetition transmission type is configured as PUSCH repetition type B. A plurality of nominal transmissions may be continuously mapped to OFDM symbols corresponding to continuous S2 (S2≥1, for example, S2=2) slots, and each nominal transmission includes a same quantity of OFDM symbols. Optionally, one nominal transmission may be partitioned into a plurality of actual transmissions. Each nominal transmission may correspond to one or more actual transmissions.

In transmission mode b2-B, for example, if OFDM symbols corresponding to a nominal transmission include an invalid symbol or cross a slot boundary, symbols for the nominal transmission are partitioned by the invalid symbol or the slot boundary into one or more parts, each part includes one or more continuous OFDM symbols, and each part is used as one actual transmission. Optionally, the foregoing partition method may not be used, and one nominal transmission is one actual transmission.

In transmission mode b2-B, optionally, each actual transmission may correspond to a same RV or different RVs of a same TB. A quantity of repetition transmissions of the actual transmission may be indicated by using RRC/MAC CE/DCI signaling. Optionally, each nominal transmission may correspond to a same RV or different RVs of a same TB. A quantity of repetition transmissions of the nominal transmission may be indicated by using RRC/MAC CE/DCI signaling.

In transmission mode b2-B, optionally, two nominal transmissions or actual transmissions may be spaced by X1 symbols. X1 may be specified in a protocol, for example, X1=1, or indicated by the network device (for example, configured by using RRC signaling, where a default value 1 or a default value 0 may be used when X1 is not configured), or reported by the terminal device in a terminal capability reporting process. One nominal transmission may be partitioned into a plurality of actual transmissions. If a symbol interval between any two actual transmissions is less than X1 symbols, the latter transmission may be canceled, or the latter transmission is translated backward until the interval reaches X1 symbols.

Transmission Mode b2-C

In transmission mode b2-C, a plurality of transmissions may be continuously mapped to OFDM symbols corresponding to continuous S3 (S3≥1, for example, S3=1) slots, and each transmission uses a same quantity of OFDM symbols. Optionally, two of PUSCH transmissions may correspond to a same RV or different RVs of a same TB. A quantity of repetition transmissions may be indicated by using RRC/MAC CE/DCI signaling.

In transmission mode b2-C, optionally, two adjacent transmissions may be spaced by X2 symbols. X2 may be specified in a protocol, for example, X2=1, or indicated by the network device (for example, configured by using RRC signaling, where a default value 1 or a default value 0 may be used when X2 is not configured), or reported by the terminal device in a terminal capability reporting process.

Transmission Mode b3

In transmission mode b3, the network device performs PUSCH simultaneous repetition transmission based on a plurality of beams/SRS resources/spatial relations/pieces of QCL information/TCI-states, that is, simultaneously transmits a same PUSCH by using a plurality of (for example, two) beams. "Simultaneous" mentioned in this embodiment of this application means "using a same time domain resource". In other words, when L is an integer greater than 1, time domain resources corresponding to the L SRS resources are the same. This transmission mode may also be referred to as simultaneous repetition transmission performed based on a plurality of SRS resources in this embodiment of this application. When the terminal device performs simultaneous repetition transmission by using the L SRS resources, the simultaneous repetition transmission may indicate that PUSCHs are simultaneously transmitted by using the L SRS resources, and the time domain resources corresponding to the L SRS resources are the same. PUSCHs transmitted by using beams may be a same RV or different RVs of a same TB.

In transmission mode b3, optionally, all frequency domain resources corresponding to a plurality of PUSCH transmissions performed by the terminal device are the same. Alternatively, frequency domain resources corresponding to any two of the plurality of PUSCH transmissions that are performed are different. Optionally, all DMRS initialization IDs (where the DMRS initialization IDs may be replaced with DMRS ports or CDM groups) corresponding to the plurality of PUSCH transmissions performed by the terminal device are the same, or DMRS initialization IDs (where the DMRS initialization IDs may be replaced with DMRS ports or CDM groups) corresponding to any two of the plurality of PUSCH transmissions performed by the terminal device are different. Optionally, the plurality of PUSCH transmissions performed by the terminal device may correspond to different data streams of a same PUSCH. Each transmission mentioned in this embodiment of this application may also be a PUSCH transmission corresponding to each SRS.

Transmission Mode b4

In transmission mode b4, the network device performs PUSCH time-division repetition transmission based on a plurality of beams/SRS resources/spatial relations/pieces of QCL information/TCI-states, that is, repeatedly transmits a same PUSCH at a plurality of different time points. "Time-division" mentioned in the embodiments of this application means "using different time domain resources". This transmission mode may also be referred to as time-division repetition transmission performed based on a plurality of SRS resources in this embodiment of this application. When the terminal device performs time-division repetition transmission by using the L SRS resources, the time-division repetition transmission may indicate that a PUSCH is transmitted by using the L SRS resources in a time-division manner, and two of the L SRS resources correspond to different time domain resources. In an optional implementation, any two of the L SRS resources correspond to different time domain resources. In other words, a PUSCH is repeatedly transmitted for a plurality of times, one beam is used for each transmission, and in PUSCH transmissions corresponding to all SRS resources, PUSCH transmissions corresponding to at least two SRS resources corresponds to different beams.

In transmission mode b4, optionally, all frequency domain resources corresponding to all PUSCH transmissions performed by the terminal device are the same. Alternatively, two of a plurality of PUSCH transmissions performed by the terminal device correspond to different frequency domain resources. Optionally, all DMRS initialization IDs (where the DMRS initialization IDs may be replaced with DMRS ports or CDM groups) corresponding to all PUSCH transmissions performed by the terminal device are the same, or DMRS initialization IDs (where the DMRS initialization IDs may be replaced with DMRS ports or CDM groups) corresponding to two of a plurality of PUSCH transmissions performed by the terminal device are different. Optionally, each transmission corresponds to a different data stream of a same PUSCH.

There may be a plurality of examples of transmission mode b4. The following provides descriptions by using transmission mode b4-A, transmission mode b4-B, and transmission mode b4-C as examples.

Transmission mode b4-A: A same PUSCH may be repeatedly sent in continuous S1 (S1≥1) slots. The PUSCH is sent once in each slot. Optionally, time domain resources used in all slots are the same. It may also be understood that time domain resources corresponding to all transmissions in transmission mode b4-A are the same as those in transmission mode b2-A (that is, the PUSCH repetition transmission type is configured as PUSCH repetition type A). In other words, transmission mode b4-A is an extension of transmission mode b2-A, and transmission mode b2-A is extended from a single beam to a plurality of beams.

Transmission mode b4-B: A plurality of nominal transmissions may be continuously mapped to OFDM symbols corresponding to continuous S2 (S2≥1, for example, S2=2) slots, and each nominal transmission includes a same quantity of OFDM symbols. Optionally, one nominal transmission may be partitioned into a plurality of actual transmissions. Each nominal transmission may correspond to one or more actual transmissions. It may also be understood that time domain resources corresponding to all transmissions in transmission mode b4-B are the same as those in transmission mode b2-B (that is, the PUSCH repetition transmission type is configured as PUSCH repetition type B). In other words, transmission mode b4-B is an extension of transmission mode b2-B, and transmission mode b2-B is extended from a single beam to a plurality of beams.

In transmission mode b4-B, optionally, two nominal transmissions or actual transmissions may be spaced by X1 symbols. X1 may be specified in a protocol, for example, X1=1, or indicated by the network device (for example, configured by using RRC signaling, where a default value 1 or a default value 0 may be used when X1 is not configured), or reported by the terminal device in a terminal capability reporting process. Alternatively, the value of X1 may be calculated according to a rule, for example, calculated based on a value of a capability parameter (for example, time required for terminal beam/antenna panel switching) reported by the terminal device. In transmission mode b4-B, one nominal transmission may be partitioned into a plurality of actual transmissions by one or more invalid symbols, and any two of actual transmissions are spaced by Y1 symbols. If Y1 is less than X1, a former transmission may be canceled, a latter transmission may be canceled, or a transmission with fewer symbols may be canceled, or it may be specified that a same beam/SRS resource is used for two transmissions.

Transmission mode b4-C: A plurality of transmissions may be continuously mapped to OFDM symbols corresponding to continuous S3 (S3≥1, for example, S3=1) slots, and each transmission uses a same quantity of OFDM symbols. It may also be understood that time domain resources corresponding to all transmissions in transmission mode b4-C are the same as those in transmission mode b2-C. In other words, transmission mode b4-C is an extension of transmission mode b2-C, and transmission mode b2-C is extended from a single beam to a plurality of beams. Optionally, transmissions may be spaced by X2 symbols. X2 may be specified in a protocol, for example, X2=1, or indicated by the network device (for example, configured by using RRC signaling, where a default value 1 or a default value 0 may be used when X2 is not configured), or reported by the terminal device in a terminal capability reporting process. Alternatively, the value of X2 may be calculated according to a rule, for example, calculated based on a value of a capability parameter (for example, time required for terminal beam/antenna panel switching) reported by the terminal device.

Transmission Mode b5

In transmission mode b5, a same PUSCH is repeatedly transmitted on a plurality of different time domain resources, and a PUSCH repetition transmission is performed on each time domain resource by using a plurality of SRS resources. In addition, at least two or any two of PUSCH repetition transmissions performed on each time domain resource correspond to different beams. The beams may be replaced with SRS resources/spatial relations/pieces of QCL information/TCI-states, or the like.

Time domain resources for each transmission in transmission mode b5 may be the same as those in transmission mode b2-A, transmission mode b2-B, or transmission mode b2-C. Optionally, frequency domain resources used by a plurality of beams corresponding to a same time point may be the same, or any two frequency domain resources are different. Frequency domain resources used by a same beam at different time points may be the same, or any two frequency domain resources are different. Optionally, DMRS initialization IDs (where the DMRS initialization IDs may be replaced with DMRS ports or CDM groups) used by a plurality of beams corresponding to a same time point may be the same, or any two DMRS initialization IDs are different. DMRS initialization IDs (where the DMRS initialization IDs may be replaced with DMRS ports or CDM groups) used by a same beam at different time points may be the same, or any two DMRS initialization IDs are different. Optionally, a plurality of transmissions corresponding to a same time point correspond to a same RV of a same TB, or any two transmissions correspond to different RVs. A same beam is used to transmit a same RV of a same TB at different time points, or any two transmissions correspond to different RVs. Optionally, a plurality of transmissions corresponding to a same time point correspond to a same data stream, or any two transmissions correspond to different data streams.

Transmission Mode b6

In transmission mode b6, the network device performs PUSCH transmission based on a plurality of beams/SRS resources/spatial relations/pieces of QCL information/TCI-states. Optionally, the plurality of beams/SRS resources correspond to different spatial flows/DMRS initialization IDs/DMRS ports/CDM groups of DMRS ports. Optionally, the plurality of beams/SRS resources correspond to a same spatial flow/DMRS port/CDM group of DMRS ports. Optionally, the plurality of beams/SRS resources correspond to a same time domain resource. Optionally, the plurality of beams/SRS resources correspond to different time domain resources. Optionally, the plurality of beams/SRS resources correspond to a same frequency domain resource. Optionally, the plurality of beams/SRS resources correspond to different frequency domain resources. The terminal device may determine, according to some preset rules, a transmission mode to be used. The terminal device determines a condition that can be satisfied currently, and then determines, according to a preset rule, a transmission mode corresponding to the condition that can be satisfied currently. The following first describes examples of conditions. For example, the following condition c1 to condition c15 show examples of several forms of the conditions.

Condition c1: The network device indicates a single beam/SRS resource/spatial relation/piece of QCL information/TCI-state.

Condition c2: The network device indicates a plurality of beams/SRS resources/spatial relations/pieces of QCL information/TCI-states.

Condition c3: The network device does not indicate any repetition transmission mode, or for example, does not indicate a repetition transmission mode by using RRC/MAC CE/DCI.

Condition c4: The network device indicates that the transmission mode used by the terminal device is time-division repetition transmission (for example, the PUSCH transmission mode is configured as transmission mode b2 or transmission mode b4 by using RRC signaling; for another example, the PUSCH repetition transmission type is configured as PUSCH-RepTypeB; for another example, the PUSCH repetition transmission type is configured as PUSCH-RepTypeA; for another example, the PUSCH repetition transmission type is configured as PUSCH-RepTypeC; for another example, the PUSCH repetition transmission type is not configured, and the PUSCH repetition transmission type is PUSCH-RepTypeA by default when not configured). The condition may also be described as follows: Any two of the plurality of SRS resources indicated by the network device correspond to different time domain resources. That is, same data is repeatedly sent at a plurality of different time points.

In condition c4, in an implementation, RRC/MAC CE/DCI may be used to indicate that time-division repetition transmission is performed. A parameter may be used to indicate to enable time-division repetition transmission, or a parameter may be used to select time-division repetition transmission from a plurality of transmission modes.

Further, a protocol may further support a plurality of transmission modes, for example, transmission mode b2-A, transmission mode b2-B, and transmission mode b2-C. The network device may indicate that one of the transmission modes is supported. For example, a transmission mode may be indicated by using a parameter, or may be indicated by in a default manner. For example, when the parameter is not configured, a transmission mode is used by default.

Condition c4 may further include a plurality of implementations, for example, the following condition c4-A, condition c4-B, and condition c4-C.

Condition c4-A: The network device indicates that the transmission mode is transmission mode b2-A, the network device indicates, by using RRC/MAC CE/DCI, that the PUSCH repetition transmission type is PUSCH repetition type A. For example, a PUSCH repetition transmission mode indication parameter such as PUSCHRepTypeIndicator-ForDCIFormat0_1 or PUSCHRepTypeIndicator-ForDCIFormat0_2 is configured as pusch-RepTypeA. For another example, when a PUSCH repetition transmission mode indication parameter such as PUSCHRepTypeIndicator-ForDCIFormat0_1 or PUSCHRepTypeIndicator-ForDCIFormat0_2 is not configured, that is, when a PUSCH repetition transmission mode indication parameter is not configured, transmission mode b2-A is used by default.

Condition c4-B: The network device indicates that transmission mode b2-B is used, and the network device indicates, by using RRC/MAC CE/DCI, that the PUSCH repetition transmission type is PUSCH repetition type B. For example, a PUSCH repetition transmission mode indication parameter such as PUSCHRepTypeIndicator-ForDCIFormat0_1 or PUSCHRepTypeIndicator-ForDCIFormat0_2 is configured as pusch-RepTypeB. For another example, when a PUSCH repetition transmission mode indication parameter such as PUSCHRepTypeIndicator-ForDCIFormat0_1 or PUSCHRepTypeIndicator-ForDCIFormat0_2 is not configured, that is, when a PUSCH repetition transmission mode indication parameter is not configured, transmission mode b2-B is used by default.

Condition c4-C: The network device indicates that transmission mode b2-C is used, and the network device indicates, by using RRC/MAC CE/DCI, that the PUSCH repetition transmission type is PUSCH repetition type C. For example, a PUSCH repetition transmission mode indication parameter such as PUSCHRepTypeIndicator-ForDCIFormat0_1 or PUSCHRepTypeIndicator-ForDCIFormat0_2 is configured as pusch-RepTypeC. For another example, when a PUSCH repetition transmission mode indication parameter such as PUSCHRepTypeIndicator-ForDCIFormat0_1 or PUSCHRepTypeIndicator-ForDCIFormat0_2 is not configured, that is, when a PUSCH repetition transmission mode indication parameter is not configured, transmission mode b2-C is used by default.

Condition c5: The network device indicates that multi-beam/SRS resource/spatial relation/QCL information/TCI-state-based time-division repetition transmission (for example, transmission mode b4) is used. Same data is repeatedly sent at a plurality of different time points, and beams used in transmissions are not exactly the same. For example, the time-division repetition transmission performed based on a plurality of beams is indicated by using RRC/MAC CE/DCI. A parameter may be used to indicate to enable multi-beam-based time-division repetition transmission, or a parameter may be used to select multi-beam-based time-division repetition transmission from a plurality of transmission modes. Further, the protocol may further support a plurality of multi-beam-based repetition transmission modes, for example, transmission mode b4-A, transmission mode b4-B, and transmission mode b4-C. The network device may indicate that one of the transmission modes is supported. For example, a transmission mode may be indicated by using a parameter, or may be indicated by in a default manner. For example, when the parameter is not configured, a transmission mode is used by default.

Condition c5 may further include a plurality of implementations, for example, the following condition c5-A, condition c5-B, and condition c5-C.

Condition c5-A: The network device indicates that the transmission mode is transmission mode b4-A, and the network device indicates, by using RRC/MAC CE/DCI, that multi-beam-based PUSCH repetition type A is used (for example, the network device may indicate that multi-beam-based transmission is used, and configures the PUSCH repetition transmission type as PUSCH repetition type A).

Condition c5-B: The network device indicates that the transmission mode is transmission mode b4-B, and the network device indicates, by using RRC/MAC CE/DCI, that PUSCH repetition type B is used (for example, the network device may indicate that multi-beam-based transmission is used, and configures the PUSCH repetition transmission type as PUSCH repetition type B).

Condition c5-C: The network device indicates that the transmission mode is transmission mode b4-C, and the network device indicates, by using RRC/MAC CE/DCI, that PUSCH repetition type C is used (for example, the network device may indicate that multi-beam-based transmission is used, and configures the PUSCH repetition transmission type as PUSCH repetition type C).

Condition c6: The network device indicates that the transmission mode is simultaneous repetition transmission (for example, transmission mode b3). The condition may also be described as follows: All of the plurality of SRS resources indicated by the network device correspond to a same time domain resource. Same data is simultaneously sent by using a plurality of beams/SRS resources/spatial relations/pieces of QCL information/TCI-states.

Condition c7: The network device indicates that the transmission mode is transmission mode b5, and transmission mode b5 may also be referred to as a combined transmission mode in this embodiment of this application.

Condition c8: The network device indicates a quantity of PUSCH transmissions by using RRC/MAC CE/DCI. The condition may be replaced with that a quantity of repetition transmissions indicated by using RRC/MAC CE/DCI is greater than 1.

Condition c9: The network device does not indicate a quantity of PUSCH transmissions. Condition c9 may be replaced with that a quantity of repetition transmissions indicated by using RRC/MAC CE/DCI is equal to 1.

Condition c10: DMRS ports indicated by the network device by using RRC/MAC CE/DCI belongs to a single DMRS CDM group.

Condition c11: DMRS ports indicated by the network device by using RRC/MAC CE/DCI belongs to a plurality of (for example, two) DMRS CDM groups.

Condition c12: The network device indicates a single DMRS port by using RRC/MAC CE/DCI.

Condition c13: The network device indicates a plurality of DMRS ports by using RRC/MAC CE/DCI.

Condition c14: A used DCI format is DCI format 0_2.

Condition c15: The network device indicates, to the terminal device, frequency domain resources corresponding to the L SRS resources, where the frequency domain resources corresponding to the L SRS resources are different/do not overlap.

The information indicated by the network device in condition c1 to condition c15 may be configured by using RRC, a MAC-CE, DCI, or other downlink information. Some conditions are described. A transmission mode corresponding to a current condition may be determined based on a preset rule and one or more of the foregoing condition c1 to condition c15. The following describes examples of the preset rule by using the following preset rules d1 to d6. During application, one or more of the following preset rules may be written into a protocol, so that both the terminal device and the network device comply with the preset rules.

Preset rule d1: If one or more of the foregoing condition c2, condition c6, condition c9, and condition c10 are satisfied, it is determined that the transmission mode is transmission mode b3. In other words, if the terminal device determines that one or more of the foregoing condition c2, condition c6, condition c9, and condition c10 are satisfied, the simultaneous repetition transmission is used. Transmission mode b3 may be replaced with "time domain resources corresponding to a plurality of SRS resources indicated by the network device are the same", or may be replaced with "simultaneous repetition transmission".

There may be a plurality of implementations for preset rule d1. The following lists several implementations of preset rule d1 by using implementation e1 to implementation e8.

Implementation e1: If the network device indicates a plurality of SRS resources (condition c2), the transmission mode is the simultaneous repetition transmission.

Implementation e2: If time domain resources corresponding to a plurality of SRS resources indicated by the network device are the same (condition c6), the transmission mode is the simultaneous repetition transmission.

Implementation e3: If a quantity of PUSCH transmissions indicated by the network device is equal to 1 (condition c9), the transmission mode is the simultaneous repetition transmission.

Implementation e4: If the network device does not indicate a quantity of PUSCH transmissions (condition c9), the transmission mode is the simultaneous repetition transmission.

Implementation e5: If DMRS ports indicated by the network device belong to a same DMRS CDM group (condition c10), the transmission mode is the simultaneous repetition transmission.

Implementation e6: If the network device indicates a plurality of SRS resources (condition c2), and time domain resources corresponding to the plurality of SRS resources indicated by the network device are the same (condition c6), the transmission mode is the simultaneous repetition transmission.

Implementation e7: If the network device indicates a plurality of SRS resources (condition c2), and a quantity of PUSCH transmissions indicated by the network device is equal to 1 (condition c9), the transmission mode is the simultaneous repetition transmission.

Implementation e8: If the network device indicates a plurality of SRS resources (condition c2), time domain resource corresponding to the plurality of SRS resources indicated by the network device are the same (condition c6), and a quantity of PUSCH transmissions indicated by the network device is equal to 1 (condition c9), the transmission mode is the simultaneous repetition transmission.

Preset rule d2: If one or more of the foregoing condition c2, condition c4 (where in preset rule d2, condition c4 may be replaced with any one of condition c4-A, condition c4-B, and condition c4-C), condition c8, and condition c10 are satisfied, it is determined that the transmission mode is transmission mode b4. In other words, if the terminal device determines that one or more of the foregoing condition c2, condition c4, condition c8, and condition c10 are satisfied, the time-division repetition transmission is used. Transmission mode b3 may be replaced with "time domain resources corresponding to two of a plurality of SRS resources indicated by the network device are different", or may be replaced with "time-division repetition transmission".

There may be a plurality of implementations for preset rule d2. The following lists several implementations of preset rule d2 by using implementation f1 to implementation f8.

Implementation f1: If the network device indicates a plurality of SRS resources (condition c2), the transmission mode is the time-division repetition transmission.

Implementation f2: If the network device indicates that time domain resources corresponding to any two of the L SRS resources are different (condition c4), the transmission mode is the time-division repetition transmission.

Implementation f3: If the network device indicates that a quantity of PUSCH transmissions is greater than 1 (condition c8), the transmission mode is the time-division repetition transmission.

Implementation f4: If the network device indicates a quantity of PUSCH transmissions (condition c8), the transmission mode is the time-division repetition transmission.

Implementation f5: If the DMRS ports indicated by the network device belong to a same DMRS CDM group (condition c10), the transmission mode is the time-division repetition transmission.

Implementation f6: If the network device indicates a plurality of SRS resources (condition c2), and the network device indicates that time domain resources corresponding to any two of the L SRS resources are different (condition c4), the transmission mode is the time-division repetition transmission.

Implementation f7: If the network device indicates a plurality of SRS resources (condition c2), and the network device indicates that a quantity of PUSCH transmissions is greater than 1 (condition c8), the transmission mode is the time-division repetition transmission.

Implementation f8: If the network device indicates a plurality of SRS resources (condition c2), the network device indicates that time domain resources corresponding to any two of the L SRS resources are different (condition c4), and the network device indicates that a quantity of PUSCH transmissions is greater than 1 (condition c8), the transmission mode is the time-division repetition transmission.

In this embodiment of this application, when a specified condition is satisfied, a transmission mode to be used is determined. This may also be described as a correspondence between a condition and a transmission mode. In an application, a corresponding condition is configured for each transmission mode. The conditions corresponding to the transmission modes do not conflict with each other. For example, if implementation e1 is used, that is, "if the network device indicates a plurality of SRS resources (condition c2), the transmission mode is the simultaneous repetition transmission", the foregoing implementation f1 is no longer used (if the network device indicates a plurality of SRS resources (condition c2), the transmission mode is the time-division repetition transmission). The condition in implementation e1 and the condition in implementation f1 are both condition c2, but corresponding transmission modes are different. It is clear that the two conditions do not coexist.

In an embodiment of this application, implementation e6 is used to determine the simultaneous repetition transmission, and implementation f6 is used to determine the time-division repetition transmission. Because there is no conflict between the two implementations, the two implementations may be applied at the same time. In other words, in this embodiment of this application, several conditions (condition c1 to condition c15) are provided, and several transmission modes (transmission mode b1 to transmission mode b6) are also provided. The conditions and the transmission modes may be flexibly combined for use, provided that no conflict exists.

Before step 203, optionally, if the terminal device determines to perform a plurality of PUSCH repetition transmissions by using a plurality of SRS resources, the terminal device further needs to determine a correspondence between an SRS resource and a quantity of transmissions. In this embodiment of this application, the correspondence may alternatively be a mapping relationship. When L is an integer greater than 1, and Q is an integer greater than 1, before step 203, the method may further include: The terminal device determines, based on the L SRS resources and a preset first correspondence between a resource and a quantity of transmissions, an SRS resource used for each of the Q PUSCH transmissions. The first correspondence may be indicated by using RRC signaling. In other words, the network device may indicate a correspondence between a resource and a quantity of transmissions by using RRC signaling. The first correspondence may be reported by using a terminal capability reporting parameter. In this case, the terminal device may determine the first correspondence to be used, and report the first correspondence to the network device.

The following describes several correspondences between a resource and a quantity of transmissions by using the following several resource mapping manners g1, g2, g3, g4, and g5 as examples. The correspondences between a resource and a quantity of transmissions may be collectively referred to as the first correspondence. The following content is described by using an example in which L SRS resources are indicated, Q PUSCH transmissions are performed, L is an integer greater than 1, and Q is an integer greater than 1. In this embodiment of this application, there is a configuration order for a plurality of resources. The configuration order of the plurality of resources may be determined when the network device configures the plurality of resources for the terminal device. For example, if the plurality of resources configured by the network device for the terminal device correspond to one resource list, the configuration order of the plurality of resources may be a sorting in the resource list. In this embodiment of this application, the configuration order of the plurality of resources may alternatively be replaced with other sortings, for example, an ascending order of indexes of the plurality of resources, or a descending order of indexes of the plurality of resources.

The PUSCH transmissions mentioned in this embodiment of this application may be transmissions performed at different time points. Alternatively, the PUSCH transmissions mentioned in this embodiment of this application may mean PUSCH transmissions corresponding to SRS resources performed at a same time point. The PUSCH transmission mentioned in this embodiment of this application may be a PUSCH transmission occasion in a protocol.

Resource Mapping Manner g1

In resource mapping manner g1, when Q is not greater than L, the L SRS resources are sequentially mapped to the Q PUSCH transmissions based on the configuration order. When Q is greater than L, the L SRS resources are sequentially mapped to the first L PUSCH transmissions in the Q PUSCH transmissions based on the configuration order, and the L SRS resources are cyclically and repeatedly mapped to the remaining (Q–L) PUSCH transmissions based on the configuration order. Alternatively, in other words, for example, resource mapping manner g1 may include: sequentially mapping resources to all transmissions based on a configuration order of the resources, and if there is still a remaining quantity of transmissions to which no resource is mapped, sequentially and cyclically mapping the resources to the remaining quantity of transmissions based on the configuration order of the resources.

Resource mapping manner g1 may also be expressed as follows: "the first and second SRS resources are applied to the first and second PUSCH transmission occasions, respectively, and the same SRS mapping pattern continues to the remaining PUSCH transmission occasions".

In other words, in resource mapping manner g1, the L SRS resources are cyclically mapped to the Q PUSCH transmissions based on the configuration order. For example, if L is 2, two SRS resources are respectively SRS 0 and SRS 1, a configuration order is "SRS 0-SRS 1", and Q is 4, in resource mapping manner g1, SRS resources sequentially corresponding to four PUSCHs are SRS 0, SRS 1, SRS 0, and SRS 1.

Resource mapping manner g1 is also applicable to non-codebook-based uplink transmission. In non-codebook-based uplink transmission, the network device indicates a plurality of groups of SRS resources to the terminal device. One group of SRS resources are used for each transmission. Each group of SRS resources correspond to one beam, so that multi-beam-based uplink transmission is implemented. In this case, the foregoing mapping manner may be used for a mapping relationship between a plurality of groups of SRS resources and a plurality of transmissions, provided that one SRS resource in the foregoing mapping manner is replaced with one group of SRS resources. Similarly, there may also be a mapping relationship between a plurality of groups of SRS resources and a plurality of groups of frequency domain resources used for data transmission. Resource mapping manner g1 may be used, provided that one SRS resource in resource mapping manner g1 is replaced with one group of SRS resources. Similarly, there may also be resource mapping manner g1 between a plurality of groups of SRS resources and a plurality of groups of time domain resources used for data transmission. Resource mapping manner g1 may be used, provided that one SRS resource in resource mapping manner g1 is replaced with one group of SRS resources. Similarly, there may also be a mapping relationship between a plurality of groups of SRS resources and a plurality of groups of spatial domain resources used for data transmission, for example, DMRS ports. Resource mapping manner g1 may be used, provided that one SRS resource in resource mapping manner g1 is replaced with one group of SRS resources.

Resource Mapping Manner g2

In resource mapping manner g1, P continuous PUSCH transmissions are used as one transmission group, and the Q PUSCH transmissions are grouped into O transmission groups. When O is not greater than L, the L SRS resources are sequentially mapped to the O transmission groups based on the configuration order. When O is greater than L, the L SRS resources are sequentially mapped to the first L transmission groups in the O transmission groups based on the configuration order, and the L SRS resources are cyclically mapped to the remaining (O-L) transmission groups based on the configuration order of the L SRS resources. Alternatively, in other words, for example, resource mapping manner g2 may include: sequentially mapping resources to all transmission groups based on a configuration order of the resources by using P continuous transmissions as one transmission group, and if there is still a remaining transmission group to which no resource is mapped, sequentially and cyclically mapping the resources to the remaining transmission group based on the configuration order of the resources.

In resource mapping manner g2, P may be an integer greater than 1. If a value of P in resource mapping manner g2 is 1, a first correspondence displayed in resource mapping manner g2 is the same as the first correspondence displayed in resource mapping manner g1. The value of P is reported by the terminal device to the network device by using a terminal capability parameter. In resource mapping manner g2, in a process in which the terminal device performs PUSCH repetition transmission, a beam may be switched once every P transmissions. Compared with a solution in which a beam is switched once in each transmission, a quantity of beam switches can be reduced, and resource consumption of the terminal device can be reduced.

In resource mapping manner g2, for example, there are a total of L=2 beams/SRS resources (SRS 0 and SRS 1, where a configuration order is sequentially SRS 0 and SRS 1), a quantity of PUSCH transmissions is Q=8, and a quantity P of transmissions of one group is 2. In other words, there are four groups, and beam/SRS resources corresponding to the four groups are SRS 0-SRS 1-SRS 0-SRS 1, in other words, beam/SRS resources corresponding to eight transmissions are SRS 0-SRS 1-SRS 1-SRS 0-SRS 1-SRS 1, respectively.

In resource mapping manner g2, when Q cannot be exactly divided by P, a quantity of transmissions of one group is smaller than that of another group. The quantity of transmissions of the group with a smaller quantity of transmissions is equal to $Q-P\cdot\lfloor Q/M \rfloor$, and the quantity of transmissions of the another group is P. In the mathematical formula in this embodiment of this application, "·" represents multiplication, "⌊ ⌋" represents rounding down, and "/" represents division. The group with a smaller quantity of transmissions may be the first group. The first $Q-P\cdot\lfloor Q/P \rfloor$ transmissions are grouped to the first group, the remaining transmissions are sequentially grouped to remaining groups, and each group is transmitted for P times. The group with a smaller quantity of transmissions may alternatively be the last group. The first $P\cdot\lfloor Q/P \rfloor$ transmissions are grouped to R−1 groups, each group is transmitted for P times, and the last $Q-P\cdot\lfloor Q/P \rfloor$ transmissions are grouped to the last group. When Q cannot be exactly divided by P, the last $Q-P\cdot\lfloor Q/P \rfloor$ transmissions may alternatively be discarded.

In resource mapping manner g2, in an optional implementation, it may be further specified that Q can be exactly divided by P For example, a value of Q indicated by the network device is an integer multiple of P. Alternatively, P indicated by the network device can be exactly divided by Q. When P is greater than Q, all transmissions are grouped into one group, and one beam/SRS resource is used.

In resource mapping manner g2, because two adjacent groups use different beam/SRS resources, the two groups may be spaced by a symbol interval of X3 symbols. X3 may be specified in a protocol, for example, X3=1, or indicated by the network device (for example, configured by using RRC signaling, where a default value 1 or a default value 0 may be used when X3 is not configured), or reported by the terminal device in a terminal capability reporting process. Alternatively, the value of X3 may be calculated according to a rule, for example, calculated based on a value of a capability parameter (for example, time required for terminal beam/antenna panel switching) reported by the terminal device.

Resource mapping manner g2 is also applicable to non-codebook-based uplink transmission. In non-codebook-based uplink transmission, the network device indicates a plurality of groups of SRS resources to the terminal device. One group of SRS resources are used for each transmission. Each group of SRS resources correspond to one beam, so that multi-beam-uplink transmission is implemented. In this case, the foregoing mapping manner may be used for a mapping relationship between a plurality of groups of SRS resources and a plurality of transmissions, provided that one SRS resource in the foregoing mapping manner is replaced with one group of SRS resources. Similarly, there may also be a mapping relationship between a plurality of groups of SRS resources and a plurality of groups of frequency domain resources used for data transmission. Resource mapping manner g2 may be used, provided that one SRS resource in resource mapping manner g2 is replaced with one group of SRS resources. Similarly, there may also be a mapping relationship between a plurality of groups of SRS resources and a plurality of groups of time domain resources used for data transmission. Resource mapping manner g2 may be used, provided that one SRS resource in resource mapping manner g2 is replaced with one group of SRS resources. Similarly, there may also be resource mapping manner g2 between a plurality of groups of SRS resources and a plurality of groups of spatial domain resources used for data transmission, for example, DMRS ports. Resource mapping manner g2 may be used, provided that one SRS resource in the foregoing mapping manner is replaced with one group of SRS resources.

In this embodiment of this application, a value of P and/or Q may be indicated by using RRC/MAC CE/DCI signaling, or may be reported by using a UE capability reporting process, or may be a value specified in a protocol. The value or an upper limit of P and/or Q may be any one of 1, 2, 3, 4, 5, 6, 7, 8, 12, and 16. A set including values of P and/or Q may be {1, 2, 3, 4, 5, 6, 7, 8, 12, 16} or a subset thereof. If configured by using RRC signaling, P and/or Q may be mandatory parameters, or may be optional parameters. When P and/or Q is not configured, a default value is used. The default value may be any one of 1, 2, 3, 4, 5, 6, 7, 8, 12, and 16. The value of P may further include a value. When P uses this value, all transmissions are used as one group, and one beam/SRS resource is used. In other words, when P uses this value, all transmissions are degraded to single-beam-based PUSCH transmission. Alternatively, the value of P may be calculated according to a rule, for example, calculated based on a value of a capability parameter value reported by the terminal device.

Resource Mapping Manner g3

In resource mapping manner g3, resource mapping manner g1 and resource mapping manner g2 may be combined for use. For example, the manner includes: sequentially mapping resources to all transmission groups based on a configuration order of the resources by using P continuous transmissions as one transmission group, and if there is still a remaining quantity of transmissions to which no resource is mapped, sequentially and cyclically mapping the resources to the remaining quantity of transmissions based on the configuration order of the resources. In other words, P continuous PUSCH transmissions are used as one transmission group, and the Q PUSCH transmissions are grouped into O transmission groups. When O is not greater than L, the L SRS resources are sequentially mapped to the O transmission groups based on the configuration order. When O is greater than L, the L SRS resources are sequentially mapped to the first L transmission groups in the O transmission groups based on the configuration order, and the L SRS resources are cyclically and repeatedly mapped to the remaining (Q−L*P) PUSCH transmissions based on the configuration order.

An example is used to explain sequential resource mapping manner g3. For example, there are a total of L=2 beams/SRS resources (SRS 0 and SRS 1, where a configuration order is sequentially SRS 0 and SRS 1), a quantity of PUSCH transmissions is Q=8, and a quantity P of transmissions of one group is 2. In other words, there are four groups. Beams/SRS resources corresponding to the first two groups are SRS 0 and SRS 1, in other words, beams/SRS resources corresponding to four transmissions are SRS 0-SRS 1-SRS 1, and beams/SRS resources corresponding to the remaining four transmissions are SRS 0-SRS 1-SRS 0-SRS 1, respectively.

Resource Mapping Manner g4

In resource mapping manner g4, Q PUSCH transmissions are grouped into R groups. In resource mapping manner g4, the Q PUSCH transmissions may be grouped according to the grouping method described in resource mapping manner g2, or another grouping method. Quantities of SRS resources included in two of the R groups may be the same or may be different. Each group is mapped to one beam/SRS resource. L beams/SRS resources are sequentially mapped to groups. For example, a first beam/SRS resource corresponds to a first group, a second beam/SRS resource corresponds to a second group, and so on. If a quantity of groups is greater than a quantity of beams/SRS resources, the previous order may be repeated to continue mapping. For example, there are a total of L=2 beams/SRS resources (beams/SRS resources 1 and 2), a quantity of transmissions is Q=8, a quantity R of groups is 4, each group is transmitted twice, and beams/SRS resources corresponding to the four groups are 1-2-1-2, in other words, beams/SRS resources corresponding to eight transmissions are 1-1-2-2-1-1-2-2. When Q can be exactly divided by R, each group includes Q/R transmissions. When Q cannot be exactly divided by R, a quantity of transmissions of one group is smaller than that of another group. The quantity of transmissions of the group with a smaller quantity of transmissions is equal to $\lfloor Q/R \rfloor$, and the quantity of transmissions of the another group is $\lceil Q/R \rceil$. The group with a smaller quantity of transmissions may be the first group. The first $\lfloor Q/R \rfloor$ transmissions are grouped to the first group, the remaining transmissions are sequentially grouped to remaining groups, and each group is transmitted for $\lceil Q/R \rceil$ times. The group with a smaller quantity of transmissions may alternatively be the last group. The first $Q-\lfloor Q/R \rfloor$ transmissions are grouped to $\lfloor Q/R \rfloor$ groups, each group is transmitted for $\lceil Q/R \rceil$ times, and the last $\lfloor Q/R \rfloor$ transmissions are grouped to the last group. When Q cannot be exactly divided by R, the last $\lfloor Q/P \rfloor$ transmissions may be discarded, the first $Q-\lfloor Q/R \rfloor$ transmissions are grouped into R−1 groups, and each group is transmitted for $\lceil Q/R \rceil$ times. It may be further specified that Q can be exactly divided by R. For example, a value of Q indicated by the network device is an integer multiple of R. Alternatively, R indicated by the network device can be exactly divided by Q. Because two adjacent groups use different beam/SRS resources, the two groups may be spaced by a symbol interval of X4 symbols. X4 may be specified in a protocol, for example, X4=1, or indicated by the network device (for example, configured by using RRC signaling, where a default value 1 or a default value 0 may be used when X4 is not configured), or reported by the terminal device in a terminal capability reporting process. Alternatively, the value of X4 may be calculated according to a rule, for example, calculated based on a value of a capability parameter (for example, time required for terminal beam/antenna panel switching) reported by the terminal device.

In resource mapping manner g4, a value of R may be indicated by using RRC/MAC CE/DCI signaling or may be reported by using a UE capability reporting process, or may be a value specified in a protocol. The value or an upper limit of R may be any one of 1, 2, 3, 4, 5, 6, 7, 8, 12, and 16. A set including values of R may be {1, 2, 3, 4, 5, 6, 7, 8, 12, 16} or a subset thereof. If R is configured by using RRC, R may be a mandatory parameter, or may be an optional parameter. When R is not configured, a default value is used. The default value may be any one of 1, 2, 3, 4, 5, 6, 7, 8, 12, and 16. The value of R may further include a value. When R uses this value, all transmissions are used as one group, and one beam/SRS resource is used. In other words, when R uses this value, all transmissions are degraded to single-beam-based PUSCH transmission. Alternatively, R may be equal to L by default, that is, the quantity of groups is always equal to the quantity of beams/resources. For example, when L=2, the Q transmissions are always grouped into two groups, and each group is transmitted by using one beam/SRS resource. Alternatively, the value of R may be calculated according to a rule, for example, calculated based on a value of a capability parameter value reported by the terminal device.

Resource mapping manner g4 is also applicable to non-codebook-based uplink transmission. In non-codebook-based uplink transmission, the network device indicates a plurality of groups of SRS resources to the terminal device. One group of SRS resources are used for each transmission. Each group of SRS resources correspond to one beam, so that multi-beam-uplink transmission is implemented. In this case, the foregoing mapping manner may be used for a mapping relationship between a plurality of groups of SRS resources and a plurality of transmissions, provided that one SRS resource in the foregoing mapping manner is replaced with one group of SRS resources. Similarly, there may also be a mapping relationship between a plurality of groups of SRS resources and a plurality of groups of frequency domain resources used for data transmission. Resource mapping manner g3 may be used, and one SRS resource in resource mapping manner g3 may be replaced with one group of SRS resources. Similarly, there may also be a mapping relationship between a plurality of groups of SRS resources and a plurality of groups of time domain resources used for data transmission. Resource mapping manner g3 may be used, provided that one SRS resource in resource mapping manner g3 is replaced with one group of SRS resources. Similarly, there may also be a mapping relationship between a plurality of groups of SRS resources and a plurality of groups of spatial domain resources used for data transmission, for example, DMRS ports. Resource mapping manner g3 may be used, provided that one SRS resource in resource mapping manner g3 is replaced with one group of SRS resources.

Resource Mapping Manner g5

In resource mapping manner g5, if Q PUSCH transmissions cross slots, the Q PUSCH transmissions may be grouped based on slots, and a same beam/SRS resource is used for all transmissions in one slot. L beams/SRS resources are sequentially mapped to slots. For example, a first beam/SRS resource corresponds to PUSCH transmissions in a first slot, a second beam/SRS resource corresponds to PUSCH transmissions in a second slot, and so on.

In this embodiment of this application, the correspondence between an SRS resource and a quantity of transmissions is described in resource mapping manner g1, resource mapping manner g2, resource mapping manner g3, resource mapping manner g4, and resource mapping manner g5. The correspondence may alternatively be a correspondence between an SRS resource and a time domain resource and/or a frequency domain resource corresponding to each transmission, provided that the quantity of transmissions in the first correspondence is replaced with a time domain resource or a frequency domain resource. In the description of the first correspondence in this embodiment of this application, the quantity of transmissions is equivalent to the time domain resource, or the quantity of transmissions is equivalent to the frequency domain resource.

In resource mapping manner g1, resource mapping manner g2, resource mapping manner g3, resource mapping manner g4, and resource mapping manner g5, at least two of the Q PUSCH transmissions may correspond to different frequency domain resources, and each transmission corresponds to a group of frequency domain resources. A group of frequency domain resources may be one or more subcarriers, REs, resource blocks (RBs), resource block groups (RBGs), precoding resource block groups (PRGs), sub-bands, control channel elements (CCEs), and the like. In this case, there is a mapping relationship between the L beams/SRS resources and the groups of frequency domain resources. It is assumed that there are a total of O1 groups of frequency domain resources. A correspondence between the L beams/SRS resources and the O1 groups of frequency domain resources may use the foregoing first correspondence, provided that the quantity of transmissions in the first correspondence is replaced with a group of frequency domain resources.

In resource mapping manner g1, resource mapping manner g2, resource mapping manner g3, resource mapping manner g4, and resource mapping manner g5, at least two of the Q PUSCH transmissions may correspond to different time domain resources, and each transmission corresponds to a group of time domain resources. A group of time domain resources may be one or more symbols/slots/mini-slots, or the like. In this case, there is a mapping relationship between the L beams/SRS resources and groups of time domain resources. It is assumed that there are a total of O2 groups of time domain resources. A correspondence between the L beams/SRS resources and the O2 groups of time domain resources may use the foregoing first correspondence, provided that the quantity of transmissions in the first correspondence is replaced with a group of time domain resources.

In resource mapping manner g1, resource mapping manner g2, resource mapping manner g3, resource mapping manner g4, and resource mapping manner g5, at least two of the Q PUSCH transmissions may correspond to different spatial domain resources, for example, DMRS ports, and each transmission corresponds to a group of DMRS ports (where each group includes one or more DMRS ports). In this case, there is a mapping relationship between the L beams/SRS resources and groups of DMRS ports. It is assumed that there are a total of O3 groups of DMRS ports. A correspondence between the L beams/SRS resources and the O3 groups of DMRS ports may use the foregoing first correspondence, provided that the quantity of transmissions in the first correspondence is replaced with a group of DMRS ports. Optionally, two of a plurality of PUSCH transmissions performed by the terminal device may correspond to a same RV or different RVs of a same data block TB, or may correspond to different data streams of same data.

Resource mapping manner g1 to resource mapping manner g5 may be applied to multi-beam-based simultaneous repetition transmission or multi-beam-based time-division repetition transmission. In an implementation, if the network device indicates a plurality of SRS resources, and configures the PUSCH repetition transmission type as PUSCH repetition type B, it is determined that a used transmission mode is multi-beam-based time-division repetition transmission. The transmission mode includes concepts of nominal transmission and actual transmission. One nominal transmission may be mapped to one or more actual transmissions. In this case, mapping between a resource and a quantity of transmissions needs to be further described. The Q PUSCH transmissions in this embodiment of this application may be used as nominal transmissions, or may be used as actual transmissions corresponding to nominal transmissions. The following uses resource mapping manner h1, resource mapping manner h2, resource mapping manner h3, and resource mapping manner h4 as examples for description.

Figure 3:
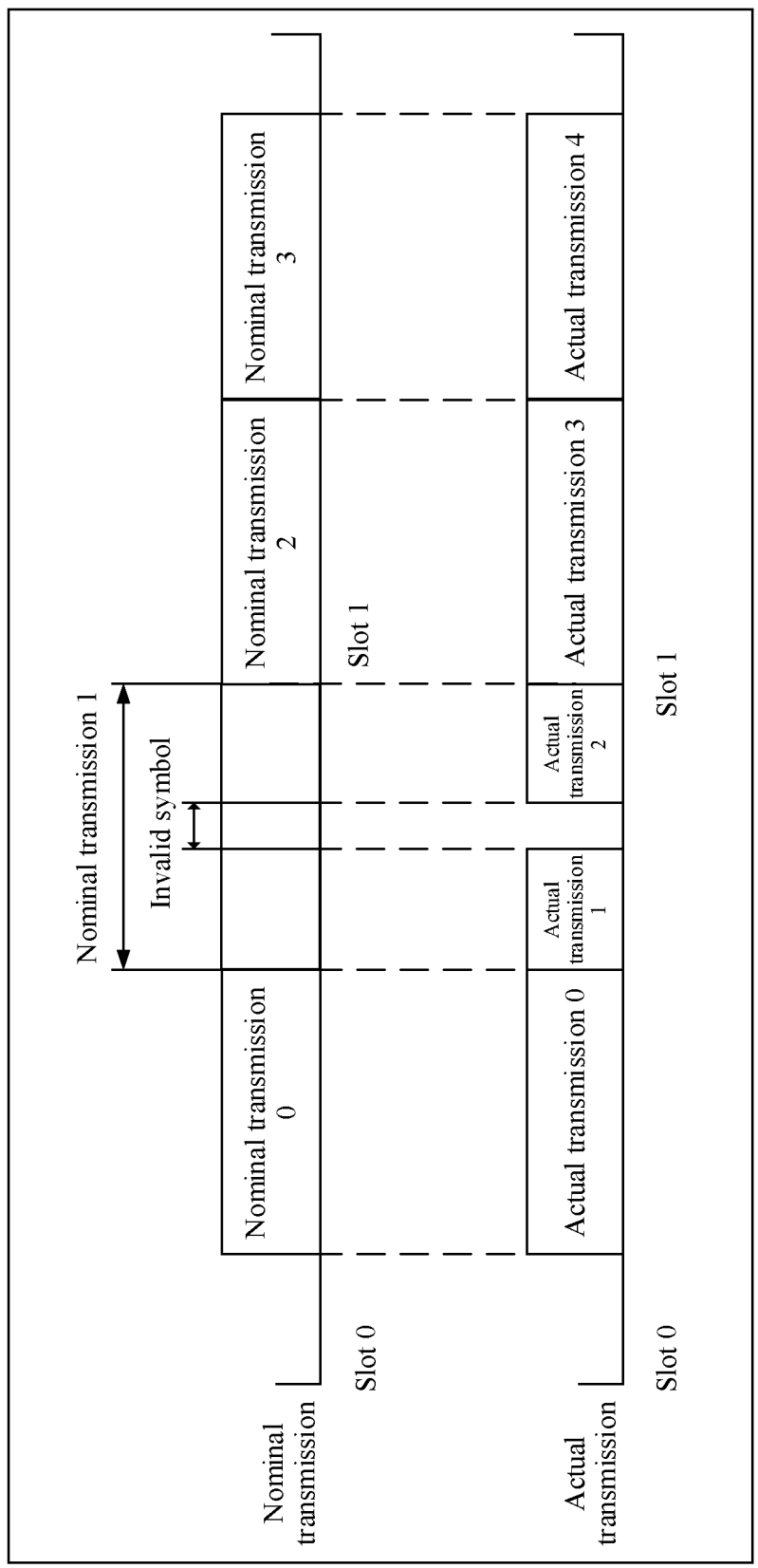
FIG. 3 is a diagram of a mapping between a nominal transmission and an actual transmission according to an embodiment of this application.

In an implementation of this application, a plurality of nominal transmissions are continuously mapped to symbols in one or more slots. Each nominal transmission corresponds to a plurality of continuous symbols. Symbols for all nominal transmissions are continuous. As shown in FIG. 3, four continuous nominal transmissions are mapped to symbols corresponding to two slots. FIG. 3 shows an example of mapping between nominal transmission and actual transmission. As shown in FIG. 3, nominal transmission 0 and nominal transmission 1 are mapped to slot 0, and nominal transmission 2 and nominal transmission 3 are mapped to slot 1. Not all symbols included in one nominal transmission can be used for PUSCH transmission. These symbols (for example, downlink symbols) that cannot be used for PUSCH transmission are referred to as invalid symbols. One transmission may be partitioned into a plurality of parts by one or more invalid symbols or slot boundaries, and each of the plurality of parts is separately mapped as one actual transmission. Nominal transmissions not including invalid symbols are independently mapped as one actual transmission. For example, as shown in FIG. 3, nominal transmission 1 includes one invalid symbol, and is mapped to two actual transmissions (actual transmission 1 and actual transmission 2), and each of the other three nominal transmissions is separately mapped as one actual transmission. Therefore, four nominal transmissions are mapped as five actual transmissions. Frequency domain resources corresponding to all actual transmissions may be the same. The terminal device sends a PUSCH once on a time-frequency resource corresponding to each actual transmission, to implement PUSCH transmission.

Resource Mapping Manner h1

A mapping relationship between a plurality of resources and a plurality of actual transmissions is determined by using any one of resource mapping manner g1 to resource mapping manner g5. In other words, the PUSCH transmission includes E nominal transmissions, where E is a positive integer. Further, a correspondence between an actual transmission and L SRS resources may be determined by using the foregoing first correspondence, or in other words, may be determined by using any one of resource mapping manner g1 to resource mapping manner g5. If the foregoing Q transmissions are actual transmissions, a correspondence between the Q transmissions and the L SRS resources may be determined by using the foregoing first correspondence.

In transmission mode b4-B, some actual transmission may be canceled. For example, an actual transmission is canceled due to a resource conflict. In this case, transmissions that are actually performed do not include this actual transmission. The Q transmissions in the foregoing method may be actual transmissions performed after a cancel operation is performed. For example, there are a total of four actual transmissions, one actual transmission is canceled, and three actual transmissions remain. The L beams/SRS resources are mapped to the three actual transmissions. The Q transmissions in the foregoing method may alternatively be actual transmissions performed before a cancel operation is performed. For example, there are a total of four actual transmissions, one actual transmission is canceled, and three actual transmissions remain. The L beams/SRS resources are mapped to the four actual transmissions. The foregoing method is also applicable to transmission modes b4-A and b4-C, because transmissions in transmission modes b4-A and b4-C may also be canceled.

Figure 4:
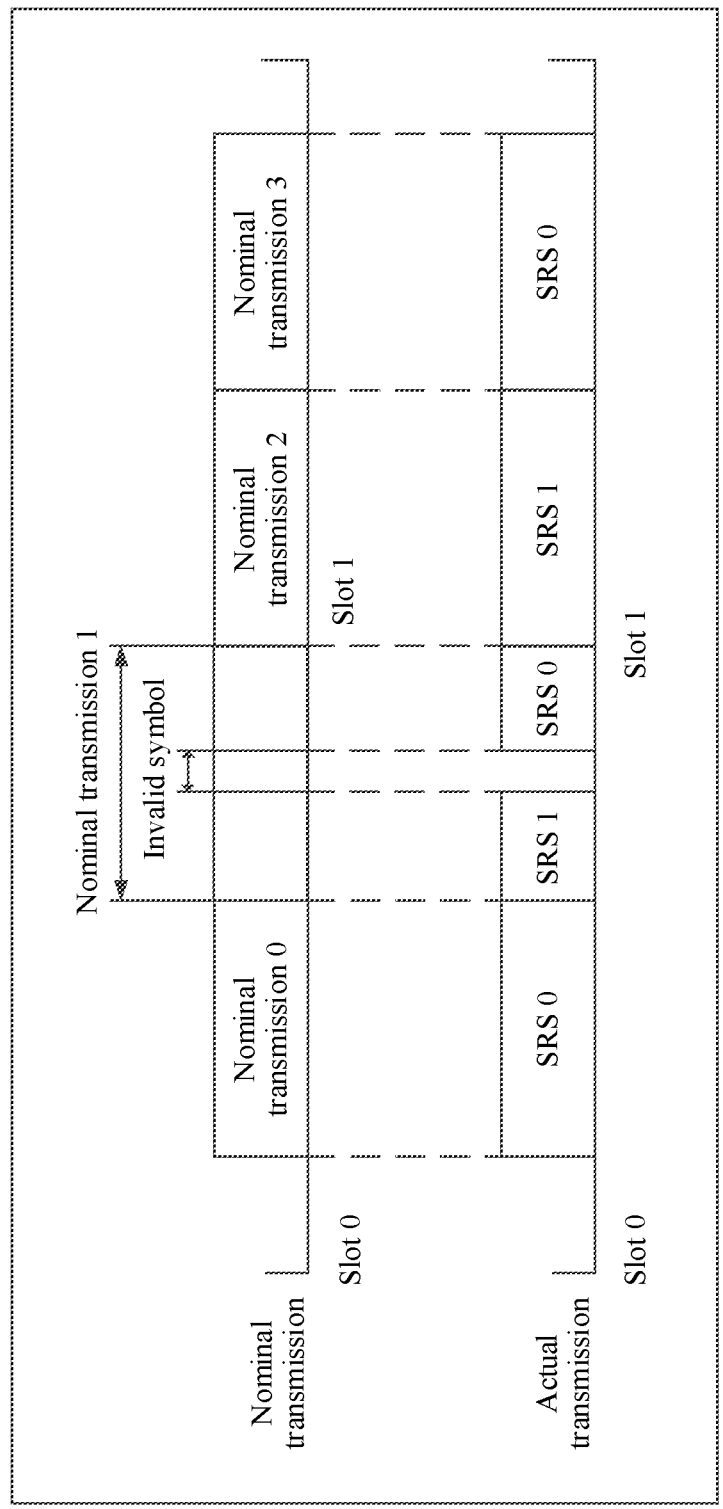
FIG. 4 is a diagram of a correspondence between a resource and an actual transmission according to resource mapping manner h1.

FIG. 4 is a diagram of an example of a correspondence between a resource and an actual transmission according to resource mapping manner h1. As shown in FIG. 4, the network device configures two SRS resources: SRS 0 and SRS 1, a configuration order is sequentially SRS 0 and SRS 1, and SRS 0 and SRS 1 are sequentially mapped to five actual transmissions in resource mapping manner g1. It can be learned from FIG. 4 that SRS resources corresponding to the five actual transmissions are sequentially SRS 0-SRS 1-SRS 0-SRS 1-SRS 0.

Resource Mapping Manner h2

In resource mapping manner h2, the terminal device determines, based on the L SRS resources and the preset first correspondence between a resource and a quantity of transmissions, an SRS resource corresponding to each of the E nominal transmissions. Alternatively, in other words, a correspondence between the L SRS resources and a nominal transmission is determined by using any one of resource mapping manner g1 to resource mapping manner g5. Further, the terminal device determines, based on the SRS resource corresponding to each nominal transmission, an SRS resource corresponding to an actual transmission corresponding to the nominal transmission.

Figure 5:
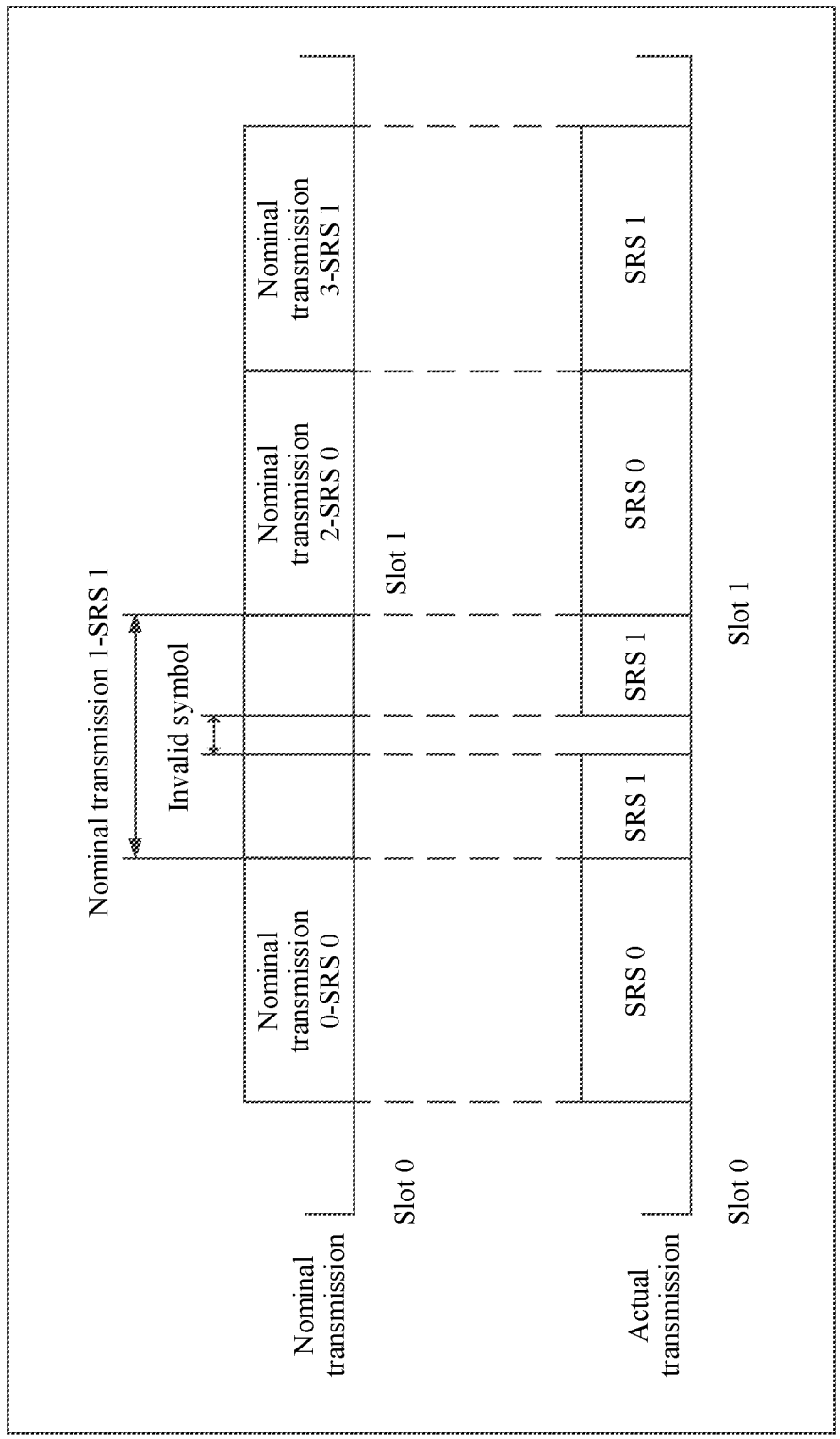
FIG. 5 is a diagram of a correspondence between a resource and an actual transmission according to resource mapping manner h2.

In resource mapping manner h2, for each nominal transmission, an SRS resource corresponding to the nominal transmission is used for an actual transmission corresponding to the nominal transmission. FIG. 5 is a diagram of an example of a correspondence between a resource and an actual transmission according to resource mapping manner h2. As shown in FIG. 5, the network device configures two SRS resources: SRS 0 and SRS 1, a configuration order is sequentially SRS 0 and SRS 1, and SRS 0 and SRS 1 are sequentially mapped to four nominal transmissions in resource mapping manner g1. It can be learned from FIG. 5 that SRS resources corresponding to the four nominal transmissions are sequentially: SRS 0-SRS 1-SRS 0-SRS 1, and an SRS resource corresponding to an actual transmission corresponding to each nominal transmission is the same as an SRS resource corresponding to the nominal transmission. As shown in FIG. 5, SRS resources corresponding to five actual transmissions are sequentially SRS 0-SRS 1-SRS 0-SRS 1.

Resource Mapping Manner h3

In resource mapping manner h3, the terminal device determines, based on the L SRS resources and the preset first correspondence between a resource and a quantity of transmissions, an SRS resource corresponding to each of the E nominal transmissions. Alternatively, in other words, a correspondence between the L SRS resources and a nominal transmission is determined by using any one of resource mapping manner g1 to resource mapping manner g5. Further, the terminal device determines, based on the SRS resource corresponding to each nominal transmission, an SRS resource corresponding to an actual transmission corresponding to the nominal transmission.

Figure 6:
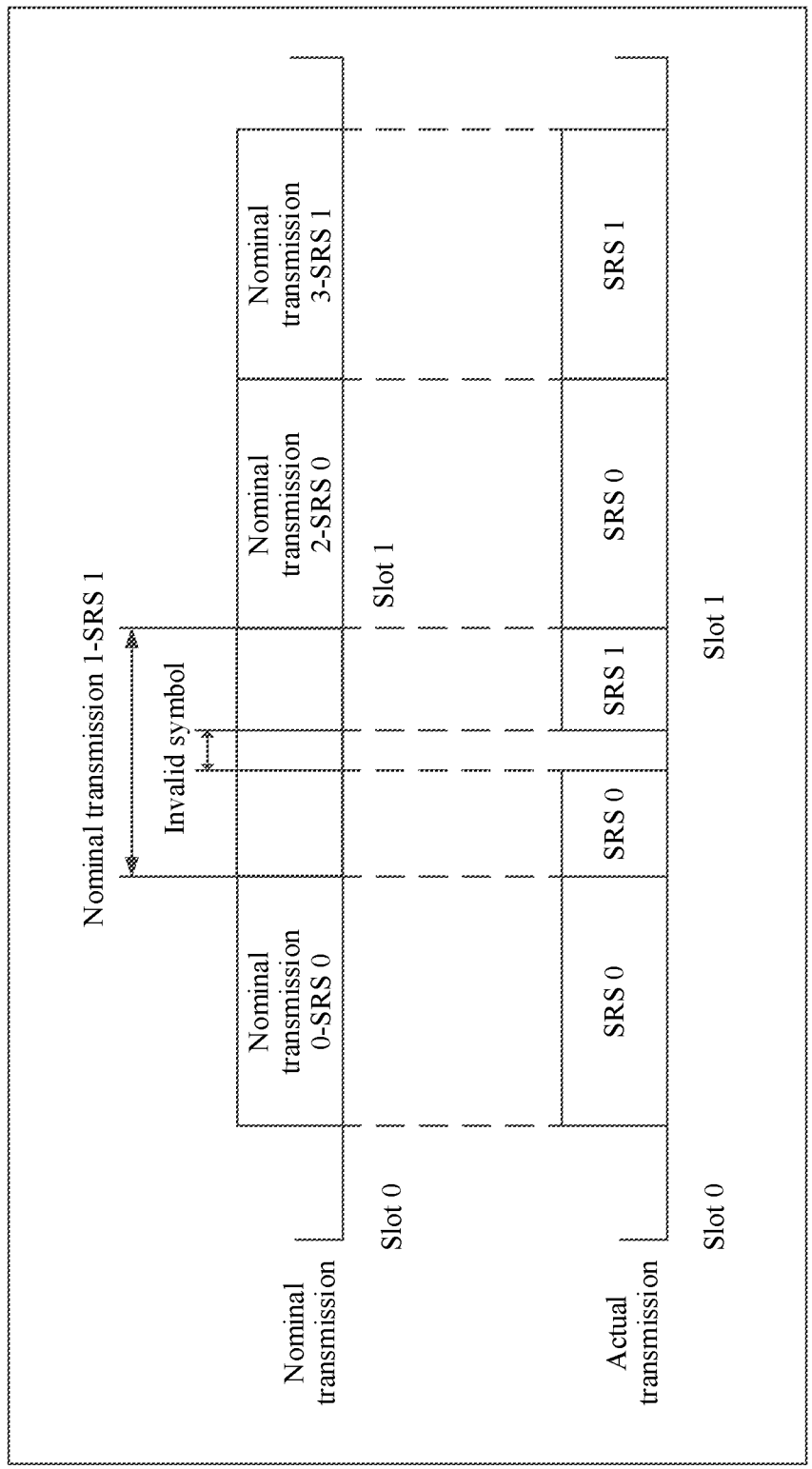
FIG. 6 is a diagram of a correspondence between a resource and an actual transmission according to resource mapping manner h3.

In resource mapping manner h3, for each nominal transmission, if the nominal transmission corresponds to one actual transmission, an SRS resource corresponding to the actual transmission is the same as an SRS resource corresponding to the nominal transmission. If the nominal transmission corresponds to a plurality of actual transmissions, for the nominal transmission, based on the L SRS resources and the first correspondence between an SRS resource and a quantity of transmissions, an SRS resource used for each actual transmission corresponding to the nominal transmission is determined. An SRS resource corresponding to the first actual transmission corresponding to the nominal transmission is an SRS resource ranking first in the configuration order of the L SRS resources. FIG. 6 is a diagram of an example of a correspondence between a resource and an actual transmission according to resource mapping manner h3. As shown in FIG. 6, the network device configures two SRS resources: SRS 0 and SRS 1, a configuration order is sequentially SRS 0 and SRS 1, and SRS 0 and SRS 1 are sequentially mapped to four nominal transmissions in resource mapping manner g1. It can be learned from FIG. 6 that SRS resources corresponding to the four nominal transmissions are sequentially: SRS 0-SRS 1-SRS 0-SRS 1. As shown in FIG. 6, SRS resources corresponding to five actual transmissions are sequentially SRS 0-SRS 1-SRS 0-SRS 1. It can be learned that an SRS resource is mapped to actual transmission 1 and actual transmission 2 by using the foregoing solution of resource mapping manner g1.

Resource Mapping Manner h4

Resource mapping manner h4 is basically similar to resource mapping manner h3, and is only for a process in which an SRS resource is mapped to a plurality of actual transmissions corresponding to one nominal transmission. An SRS resource corresponding to the first actual transmission corresponding to the nominal transmission is an SRS resource corresponding to the nominal transmission. This is not the case as what is described in resource mapping manner h3: "An SRS resource corresponding to the first actual transmission corresponding to the nominal transmission is an SRS resource ranking first in the configuration order of the L SRS resources." Except this, the content is basically the same, and details are not described again.

Figure 7:
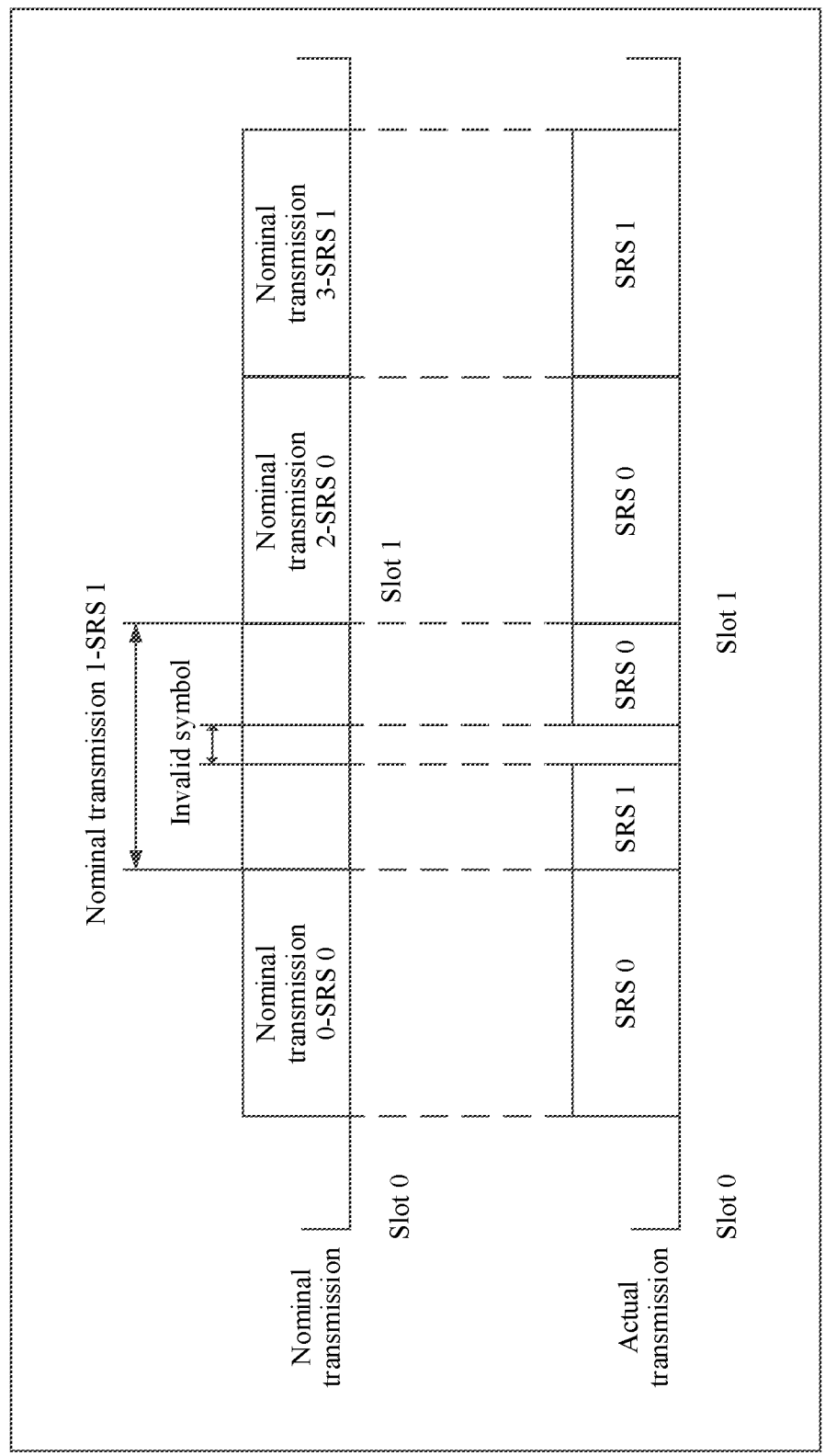
FIG. 7 is a diagram of a correspondence between a resource and an actual transmission according to resource mapping manner h4.

FIG. 7 is a diagram of an example of a correspondence between a resource and an actual transmission according to resource mapping manner h4. As shown in FIG. 7, the network device configures two SRS resources: SRS 0 and SRS 1, a configuration order is sequentially SRS 0 and SRS 1, and SRS 0 and SRS 1 are sequentially mapped to four nominal transmissions in resource mapping manner g1. It can be learned from FIG. 7 that SRS resources corresponding to the four nominal transmissions are sequentially: SRS 0-SRS 1-SRS 0-SRS 1. As shown in FIG. 7, SRS resources corresponding to five actual transmissions are sequentially SRS 0-SRS 1-SRS 0-SRS 1.

In this embodiment of this application, in the multi-beam-based time-division repetition transmission, a same RV of a same TB may be transmitted in PUSCH transmissions, or different RVs of a same TB may be transmitted in two of PUSCH transmissions. For example, each TB may correspond to four RVs, and RV identifiers of the four RVs are respectively RV 0, RV 1, RV 2, and RV 3. An RV identifier corresponding to each PUSCH transmission may be determined by using an RV mapping rule. This embodiment of this application provides the following RV mapping rules to describe an example of a correspondence between a quantity of transmissions and an RV identifier.

RV Mapping Rule

If the network device indicates a plurality of SRS resources, and configures the PUSCH repetition transmission type as PUSCH repetition type B, the PUSCH transmission includes E nominal transmissions, each nominal transmission corresponds to one or more actual transmissions, and E is a positive integer.

Before step 203, the method further includes: The terminal device determines an RV identifier corresponding to each of the E nominal transmissions; and the terminal device determines, based on the RV identifier corresponding to each nominal transmission, an RV identifier corresponding to each actual transmission corresponding to the nominal transmission.

In an optional implementation, for each nominal transmission, RV identifiers corresponding to all actual transmissions corresponding to the nominal transmission are an RV identifier corresponding to the nominal transmission. If one nominal transmission is partitioned into a plurality of actual transmissions, the plurality of actual transmissions corresponding to the nominal transmission all uses RVs corresponding to the nominal transmission. Each actual transmission transmits an independent RV, or each actual transmission is used to transmit a part of data of the RV. Data transmitted in all the actual transmissions corresponding to the nominal transmission forms a complete RV. A nominal transmission that is not partitioned is mapped as an actual transmission, and the actual transmission uses an RV corresponding to the nominal transmission.

In the RV mapping rule, there may be a plurality of implementations for determining an RV identifier corresponding to each of the E nominal transmissions. The following uses RV mapping rule 1 and RV mapping rule 2 as examples for description.

RV Mapping Rule 1

In RV mapping rule 1, when a first sorting relationship exists between a plurality of RV identifiers corresponding to a PUSCH transmission, the plurality of RV identifiers are sequentially and cyclically mapped to all nominal transmissions based on an RV identifier indicated by downlink control information and the first sorting relationship.

In RV mapping rule 1, the first sorting relationship between a plurality of RVs includes: RV 0-RV 2-RV 3-RV 1, RV 0-RV 3-RV 0-RV 3, or RV 0-RV 0-RV 0.

In RV mapping rule 1, for example, cyclic traversal is performed in an order of "RV 0-RV 2-RV 3-RV 1". An identifier of an RV used in the first transmission is indicated by an RV field in DCI, and cyclic traversal is performed in an order of "RV 0-RV 2-RV 3-RV 1" on RVs used in remaining transmissions. For example, if an RV identifier indicated in the DCI is RV 0, RV identifiers corresponding to all nominal transmissions are sequentially "RV 0-RV 2-RV 3-RV 1-RV 0-RV 2-RV 3-RV 1 . . . ". If an RV identifier indicated in the DCI is RV 2, RV identifiers corresponding to all nominal transmissions are sequentially "RV 2-RV 3-RV 1-RV 0-RV 2-RV 3-RV 1-RV 0 . . . ". If an RV identifier indicated in the DCI is RV 3, RVs for all nominal transmissions are "RV 3-RV 1-RV 0-RV 2-RV 3-RV 1-RV 0-RV 2 . . . ". If an RV identifier indicated in the DCI is RV 1, RVs for all nominal transmissions are "RV 1-RV 0-RV 2-RV 3-RV 1-RV 0-RV 2-RV 3 . . . ".

RV Mapping Rule 2

RV mapping rule 2 includes: For a nominal transmission corresponding to an indicated first SRS resource, sequentially and cyclically mapping, based on an RV identifier indicated by downlink control information and a second sorting relationship, a plurality of RV identifiers to nominal transmissions corresponding to the SRS resource, where there is a difference of an offset value between an RV identifier of each nominal transmission corresponding to an $i^{th}$ SRS resource and an RV identifier of each nominal transmission corresponding to an $(i+1)^{th}$ SRS resource. In an optional implementation, if an offset value is added to the RV identifier of each nominal transmission corresponding to the ith SRS resource, and if the RV identifier is greater than 3 after the offset value is added, a modulo operation is performed on 4.

In RV mapping rule 2, in an optional implementation, a second sorting relationship corresponding to the first SRS resource in the L SRS resources is the same as a first sorting relationship. A second sorting relationship corresponding to the $(i+1)^{th}$ SRS resource in the L SRS resources is: a second sorting relationship corresponding to the $i^{th}$ SRS resource plus a preset offset. The correspondence can be expressed in the following formula: $RV_{i+1,j}=(RV_{i,j}=\text{offset})\%4$. That is, an offset is added and then a modulo operation is performed on 4, to ensure that the RV identifier is between 0 and 3. In the formula, $RV_{i+1,j}$ is $j^{th}$ nominal transmission corresponding to an $(i+1)^{th}$ SRS resource, and $RV_{i,j}$ is a $j^{th}$ nominal transmission corresponding to an $i^{th}$ SRS resource. j is a positive integer. i is a positive integer. offset is a preset offset, and a value range is all positive integers. It should be noted that in this embodiment of this application, an example in which a value of i starts from 1 is used for description. In this case, counting is performed starting from the first SRS resource. In another implementation, counting may alternatively be performed starting from a $0^{th}$ SRS resource. In this case, a value of i is 0 and a positive integer. In this embodiment of this application, an example in which a value of j starts from 1 is used for description. In this case, counting is performed starting from the first nominal transmission. In another implementation, counting may alternatively be performed starting from a $0^{th}$ nominal transmission. In other words, in this case, a value of j is 0 and a positive integer.

For example, the L SRS resources are respectively SRS 0 and SRS 1. A second sorting relationship corresponding to SRS 0 is the same as the first sorting relationship, for example, "RV 0-RV 2-RV 3-RV 1". A preset offset needs to be added to a second sorting relationship corresponding to SRS 1. For example, the preset offset is 1, that is, the second sorting relationship corresponding to SRS 1 is obtained by cyclically shifting the second sorting relationship corresponding to SRS 0 by one bit. It may be learned that the second sorting relationship corresponding to SRS 1 is "RV 2-RV 3-RV 1-RV 0". Based on an order of "RV 0-RV 2-RV 3-RV 1", all RV identifiers are sequentially and cyclically mapped to all nominal transmissions corresponding to SRS 0. Based on an order of "RV 2-RV 3-RV 1-RV 0", all RV identifiers are sequentially and cyclically mapped to all nominal transmissions corresponding to SRS 1.

In this embodiment of this application, during multi-beam-based time-division repetition transmission, frequency hopping transmission may be used, and a frequency hopping mechanism may be used between a plurality of transmissions corresponding to each beam/SRS resource. The Q PUSCH transmissions include a first PUSCH transmission and a second PUSCH transmission, the first PUSCH transmission and the second PUSCH transmission are any two adjacent transmissions in a plurality of transmissions corresponding to a same SRS resource, and a frequency domain start position corresponding to the first PUSCH transmission is different from a frequency domain start position corresponding to the second PUSCH transmission. For example, one beam corresponds to Z transmissions. A first part of frequency (first hop) is used for the first transmission, a second part of frequency (second hop) is used for the second transmission, the first of frequency (first hop) is used for the third transmission, the second part of frequency (second hop) is used for the fourth transmission, and so on. A quantity of frequency domain resources included in the first part of frequency is the same as a quantity of frequency domain resources included in the second part of frequency, but start locations of the frequency domain resources are different. For another example, one SRS resource corresponds to four PUSCH transmissions, and there are two frequency domain start locations: frequency domain start location 0 and frequency domain start location 10. In this case, frequency domain start locations of frequency domain resources corresponding to the four PUSCH transmissions corresponding to the SRS resource are: frequency domain start location 0, frequency domain start location 10, frequency domain start location 0, and frequency domain start location 10.

The terminal device may further report, by using a terminal capability parameter, whether the terminal device supports one of the following content: multi-beam/SRS resource-based PUSCH repetition transmission, multi-beam/SRS resource-based PUSCH simultaneous repetition transmission, multi-beam/SRS resource-based PUSCH time-division repetition transmission, multi-beam/SRS resource-based PUSCH combination repetition transmission, multi-beam/SRS resource-based PUSCH repetition transmission type A, multi-beam/SRS resource-based PUSCH repetition transmission type B, and multi-beam/SRS resource-based PUSCH repetition transmission type C. Optionally, the terminal device may report, by using the terminal capability parameter, an upper limit of a quantity of beams/SRS resources used for transmission. Optionally, the terminal device may report an upper limit of a quantity of PUSCH repetition transmissions by using the terminal capability parameter. Optionally, the terminal device may report, by using the terminal capability parameter, an upper limit of a quantity of PUCCH transmissions corresponding to a single beam. Optionally, the terminal device may report, by using the terminal capability parameter, whether the terminal device supports sending a PUSCH by using a plurality of beams/SRSs.

In this embodiment of this application, the foregoing content is described by using PUSCH uplink transmission as an example. This embodiment of this application further provides another implementation. The terminal device may alternatively perform PUCCH repetition transmission based on a plurality of transmit beams/spatial relations. For example, the network device activates, for the terminal device, L spatial relations used for PUCCH transmissions, and the terminal device performs Q PUCCH repetition transmissions based on the L spatial relations. The Q repetition transmissions may be slot-level repetition transmissions, that is, a PUCCH is transmitted once in each slot. Alternatively, the Q repetition transmissions may be symbol-level repetition transmissions, that is, a PUCCH may be repeatedly transmitted for a plurality of times in each slot. Each transmission occupies several symbols, and the Q repetition transmissions may be located in a same slot or may be located in a plurality of continuous slots. In the symbol-level repetition transmission, PUCCH transmissions may be spaced by an interval of T symbols. T may be reported by the terminal device by using the terminal capability parameter, T may be configured by the network device, T may be specified in a protocol, or T may be calculated (for example, calculated based on one or more of a quantity of remaining symbols in a slot, a quantity of uplink symbols, and a quantity of PUCCH repetition transmissions). The PUCCH repetition transmission may use a same transmission mode as the PUSCH repetition transmission, for example, any transmission mode in transmission mode b1 to transmission mode b6. Certainly, when a transmission mode further includes a plurality of types of transmission sub-modes, the transmission sub-modes are also suitable for the PUSCH. For example, transmission mode b2 includes a plurality of types of transmission sub-modes, for example, transmission mode b2-A. When transmission mode b2-A is suitable for the PUCCH, the PUSCH may be replaced with the PUCCH. Different PUCCH formats may be used for the Q transmissions.

The quantity of PUCCH repetition transmissions may be indicated by the network device by using RRC/MAC CE/DCI signaling, or may be reported by using the terminal capability parameter. The quantity of PUCCH repetition transmissions may alternatively be dynamically calculated, for example, determined (or calculated) based on one or more of a start symbol of the first PUCCH transmission in the Q PUCCH transmissions (or a PUCCH start symbol indicated by the network device), a quantity of symbols occupied by a single PUCCH transmission, a specified (or configured) symbol interval between two PUCCH transmissions, a quantity of remaining symbols in a slot, a quantity of downlink symbols in a slot, a quantity of uplink symbols in a slot, and a PUCCH format in a slot. It may be specified that the PUCCH repetition transmission is used only for a specific PUCCH format. For example, it is specified that only PUCCH format 0 and PUCCH format 2 can be repeatedly transmitted by using a PUCCH. Alternatively, repetition transmission modes of PUCCH formats may be limited. For example, only the slot-level repetition transmission can be used for PUCCH format 1, PUCCH format 3, and PUCCH format 4. Alternatively, only the symbol-level repetition transmission can be used for PUCCH format 0 and PUCCH format 2. Alternatively, the symbol-level repetition transmission and the slot-level repetition transmission can be used for PUCCH format 0 and PUCCH format 2.

The terminal device may determine, based on a time-frequency resource used for the first PUCCH transmission, a time-frequency resource corresponding to each subsequent PUCCH repetition transmission. For example, a time domain resource for each remaining PUCCH repetition transmission is determined based on a time-frequency resource for the first PUCCH transmission and a symbol interval between all PUCCH transmissions. When the Q PUCCH transmissions cross a plurality of slots, a start symbol of the first transmission in each slot is determined by using a PUCCH start symbol parameter configured by the network device, or a start symbol of the first PUCCH transmission in a next slot is determined by using a time domain resource used for the last PUCCH transmission in a previous slot, for example, determined based on an interval between the two. Quantities of symbols used for all PUCCH transmissions are the same. Same frequency domain resources may be used for all the PUCCH transmissions. In the latter case, frequency domain resources for all PUCCH transmissions are spaced by a fixed quantity of RBs.

Spatial relations used for all PUCCH transmissions may be determined by using the foregoing method for determining an SRS resource for each PUSCH (for example, by using one of resource mapping manner g1 to resource mapping manner g5 and resource mapping manner h1 to resource mapping manner h4). For example, the L spatial relations are sequentially mapped to the Q PUCCH transmissions based on a specific order (for example, an activation order, or an ascending order or a descending order of indexes). When Q is greater than L, the L spatial relation resources are sequentially mapped to the first L transmissions in the Q transmissions based on a specific order (for example, an activation order, or an ascending order or a descending order of indexes), and the L spatial relation resources are cyclically mapped to the remaining (Q-L) transmissions based on the foregoing order. For another example, P continuous PUCCH transmissions are used as one transmission group, and Q PUCCH transmissions are grouped into O transmission groups. When O is not greater than L, the L spatial relations are sequentially mapped to the O transmission groups based on a specific order (for example, an activation order, or an ascending or a descending order of indexes). When O is greater than L, the L spatial relation resources are sequentially mapped to the first L transmission groups in the O transmission groups based on a specific order (for example, an activation order, or an ascending order or a descending order of indexes), and the L spatial relation resources are cyclically mapped to the remaining (O-L) transmission groups based on the foregoing order.

In the PUCCH repetition transmission, a spatial relation corresponding to each transmission may alternatively be mapped by using an index of a slot corresponding to each transmission. For example, there are a total of two spatial relations, a first spatial relation is used for a PUCCH transmission corresponding to an odd slot number, and a second spatial relation is used for a PUCCH transmission corresponding to an even slot number. Alternatively, a first spatial relation is used for a PUCCH transmission corresponding to an even slot number, and a second spatial relation is used for a PUCCH transmission corresponding to an odd slot number. The first spatial relation and the second spatial relation are determined based on an order of spatial relations indicated by the network device through RRC configuration/MAC CE activation/DCI, or may be determined based on an order of spatial relation indexes. A spatial relation corresponding to each transmission may alternatively be determined based on other transmissions in a current slot. For example, if the network device indicates spatial relations 1 and 2, and spatial relation 1 is already used for other uplink transmissions in the current slot, the terminal device uses spatial relation 1 to transmit a PUCCH in the slot.

Frequency hopping transmission may be performed on a plurality of PUCCH transmissions corresponding to a same spatial relation. For example, the network device configures two start frequency domain positions, and start frequency domain positions of any two adjacent PUCCH transmissions are different and are respectively the two start frequency domain positions. The terminal device may report, by using the terminal capability parameter, whether the terminal device supports the frequency hopping mechanism.

The network device may indicate (for example, by using DCI), a power control command (TPC command) for a PUCCH corresponding to each transmit beam/spatial relation. The network device may alternatively indicate a power control difference between a PUCCH corresponding to another beam/spatial relation and a PUCCH corresponding to a first beam/spatial relation.

The terminal device may report, by using the terminal capability parameter, whether the terminal device supports PUCCH repetition transmission/multi-beam-based PUCCH repetition transmission. Alternatively, the terminal device may report, by using the terminal capability parameter, whether the terminal device supports symbol-level PUCCH repetition transmission/multi-beam-based symbol-level PUCCH repetition transmission. Alternatively, the terminal device may report, by using the terminal capability parameter, whether the terminal device supports slot-level PUCCH repetition transmission/multi-beam-based slot-level PUCCH repetition transmission. Alternatively, an upper limit of a quantity of beams used for transmission may be reported by using the terminal capability parameter. Alternatively, an upper limit of a quantity of repetition transmissions may be reported by using the terminal capability parameter. Alternatively, an upper limit of a quantity of transmissions corresponding to a single beam may be reported by using the terminal capability parameter. Alternatively, whether sending a PUCCH by using a plurality of beams/SRSs is supported may be reported by using the terminal capability parameter.

Figure 8:
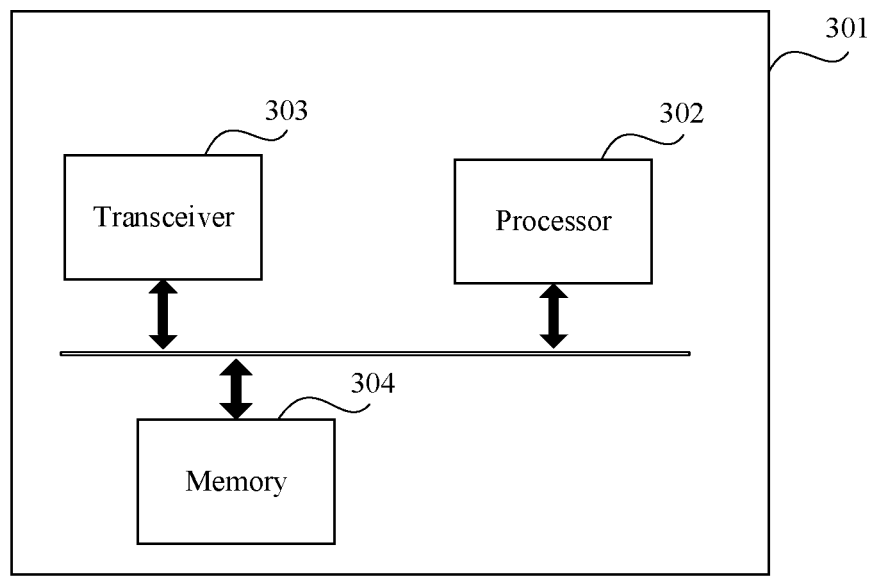
FIG. 8 is a diagram of a communication device according to an embodiment of this application.

Based on the foregoing methods, FIG. 8 is a diagram of a communication device 301 according to an embodiment of this application. As shown in FIG. 8, the communication device may be a terminal device or a network device, or may be a chip or a circuit, such as a chip or a circuit that may be disposed in the terminal device, or a chip or a circuit that may be disposed in the network device.

Further, the communication device 301 may further include a bus system. A processor 302, a memory 304, and a transceiver 303 may be connected through the bus system.

It should be understood that the processor 302 may be a chip. For example, the processor 302 may be a field programmable gate array (FPGA), an application-specific integrated circuit (ASIC), a system-on-a-chip (SoC), a central processing unit (CPU), a network processor (NP), a digital signal processing circuit (DSP), a micro controller unit (MCU), a programmable logic device (PLD), or another integrated chip.

In an implementation process, all steps of the foregoing methods may be completed by using an integrated logic circuit of hardware in the processor 302 or by using instructions in a software form. The steps of the methods disclosed with reference to the embodiments of this application may be directly performed by a hardware processor, or may be performed by using a combination of hardware in the processor 302 and a software module. The software module may be located in a mature storage medium in the art, such as a random access memory, a flash memory, a read-only memory, a programmable read-only memory, an electrically erasable programmable memory, or a register. The storage medium is located in the memory 304, and the processor 302 reads information in the memory 304 and completes the steps in the foregoing methods in combination with hardware of the processor 302.

It should be noted that the processor 302 in embodiments of this application may be an integrated circuit chip, and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of this application. The general-purpose processor may be a microprocessor, or the processor may be any conventional processor or the like. The steps of the methods disclosed with reference to embodiments of this application may be performed by a hardware decoding processor, or may be performed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory 304 in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. For example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memory in the system and the method described in this specification is intended to include, but not limited to, these memories and any memory of another proper type.

When the communication device 301 corresponds to the terminal device in the foregoing methods, the communication device may include a processor 302, a transceiver 303, and a memory 304. The memory 304 is configured to store instructions, and the processor 302 is configured to execute the instructions stored in the memory 304, to implement the related solution of the terminal device in the method corresponding to any one or more items shown in FIG. 7.

In an optional implementation, when the communication device 301 is the foregoing terminal device or a chip or a circuit disposed in the terminal device, the processor 302 is configured to determine L SRS resources, where L is an integer greater than 1, and at least two of the L SRS resources correspond to different spatial relations; and the transceiver 303 is configured to perform Q PUSCH transmissions by using the L SRS resources, where Q is an integer greater than 1.

In an optional implementation, when the communication device 301 is the foregoing terminal device or a chip or a circuit disposed in the terminal device, the transceiver 303 is configured to receive first information; and the processor 302 is configured to determine, based on a field value of a first field in the first information and a preset correspondence between a field value and an SRS resource, the L SRS resources indicated by the field value of the first field. The preset correspondence between a field value and an SRS resource satisfies the following content. For details, refer to the content described in the foregoing method embodiments. Details are not described herein again.

In an optional implementation, when the communication device 301 is the foregoing terminal device or a chip or a circuit disposed in the terminal device, the processor 302 is further configured to determine a PUSCH repetition transmission mode. For the PUSCH repetition transmission mode, refer to the content described in the foregoing method embodiments. Details are not described herein again.

In an optional implementation, when the communication device 301 is the foregoing terminal device or a chip or a circuit disposed in the terminal device, the processor 302 is further configured to determine, based on a first correspondence between an SRS resource and a PUSCH transmission, an SRS resource used for each of the Q PUSCH transmissions. For a correspondence between a resource and a quantity of transmissions, refer to the content described in the foregoing method embodiments. Details are not described herein again.

In an optional implementation, when the communication device 301 is the foregoing terminal device or a chip or a circuit disposed in the terminal device, the processor 302 is further configured to determine an RV identifier corresponding to each of E nominal transmissions. For a specific manner, refer to the content described in the foregoing method embodiments. Details are not described herein again.

For other content such as a correspondence between a resource and a time domain resource and a correspondence between a resource and a frequency domain resource, refer to the content described in the foregoing method embodiments. Details are not described herein again.

In an optional implementation, when the communication device 301 is the foregoing network device or a chip or circuit disposed in the network device, the transceiver 303 is configured to: send first information to a terminal device, where the first information is used to indicate L SRS resources, L is an integer greater than 1, and at least two of the L SRS resources correspond to different spatial relations; and receive Q PUSCH transmissions sent by the terminal device by using the L SRS resources, where Q is an integer greater than 1.

For concepts, explanations, detailed descriptions, and other steps of the communication device that are related to the technical solutions provided in embodiments of this application, refer to the descriptions of the content in the foregoing method embodiments or other embodiments. Details are not described herein again.

Figure 9:
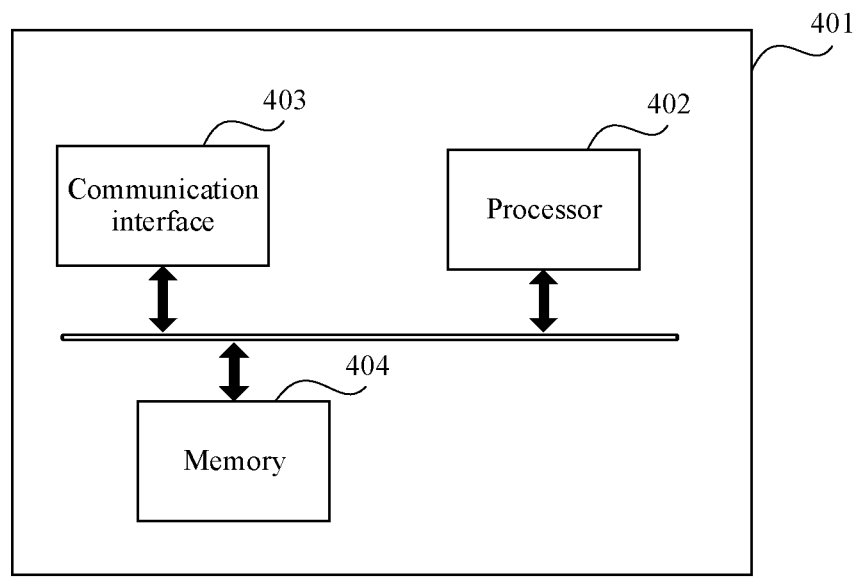
FIG. 9 is a diagram of another communication device according to an embodiment of this application.

According to the foregoing methods, FIG. 9 is a structural diagram of a communication device according to an embodiment of this application. As shown in FIG. 9, a communication device 401 may include a memory 404, a processor 402, and a communication interface 403. The memory 404 is configured to input and/or output information. The processor 402 is configured to execute a computer program or instructions, so that the communication device 401 implements the terminal device-side method in the related solution in FIG. 7, or the communication device 401 implements the network device-side method in the related solution in FIG. 7. In this embodiment of this application, the communication interface 403 may implement the solution implemented by the transceiver 303 in FIG. 8, and the processor 402 may implement the solution implemented by the processor 302 in FIG. 8. Details are not described herein again.

Figure 10:
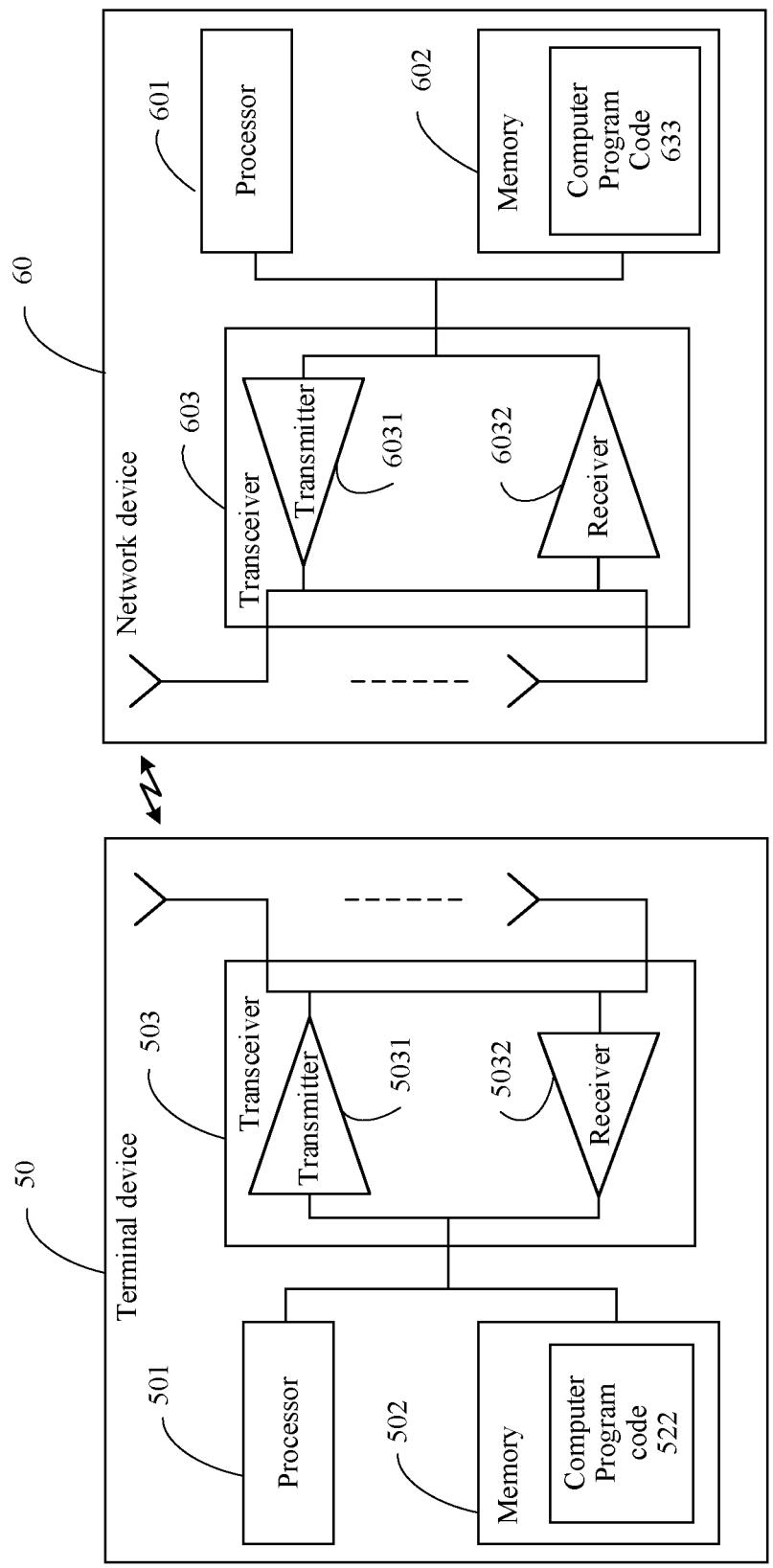
FIG. 10 is a diagram of a communication system according to an embodiment of this application.

According to the method provided in the embodiments of this application, an embodiment of this application further provides a communication system. The communication system includes the foregoing network device and one or more terminal devices. FIG. 10 is a diagram of an example of a communication system. As shown in FIG. 10, the communication system includes a terminal device 50 and a network device 60. As shown in FIG. 10, the terminal device 50 may include a memory 502, a processor 501, and a transceiver 503. The transceiver 503 may include a transmitter 5031 and a receiver 5032. The receiver 5032 may be configured to receive transmission control information by using an antenna, and the transmitter 5031 may be configured to send transmission feedback information to the network device 60 by using the antenna.

As shown in FIG. 10, the network device 60 may include a memory 602, a processor 601, and a transceiver 603. The transceiver 603 may include a transmitter 6031 and a receiver 6032. The transmitter 6031 may be configured to send transmission control information to the terminal device 50 by using an antenna, and the receiver 6032 may be configured to receive, by using an antenna, transmission feedback information sent by the terminal device 50.

In this embodiment of this application, the transceiver 503 may implement the terminal device-side solution implemented by the transceiver 303 in FIG. 8 or the communication interface 403 in FIG. 9, and the processor 501 may implement the terminal device-side solution implemented by the processor 302 in FIG. 8 or the processor 402 in FIG. 9. Details are not described herein again. In this embodiment of this application, the transceiver 603 may implement the network device-side solution implemented by the transceiver 303 in FIG. 8 or the communication interface 403 in FIG. 9, and the processor 601 may implement the network device-side solution implemented by the processor 302 in FIG. 8 or the processor 302 in FIG. 9. Details are not described herein again.

Figure 11:
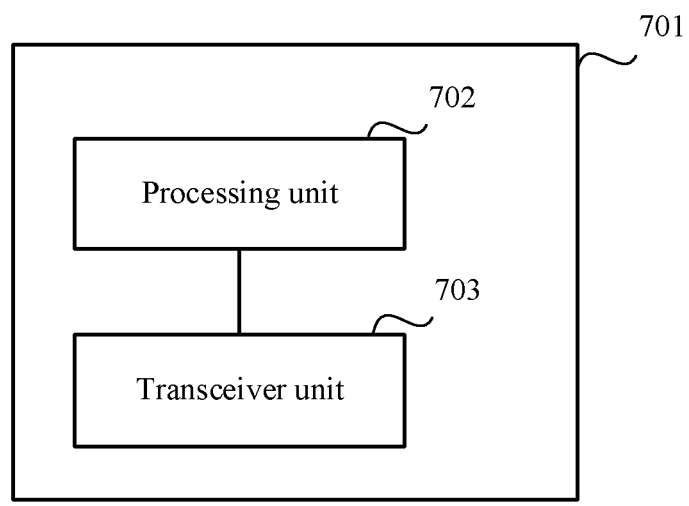
FIG. 11 is a diagram of another communication device according to an embodiment of this application.

Based on the foregoing embodiments and a same concept, FIG. 11 is a diagram of a communication device according to an embodiment of this application. As shown in FIG. 11, the communication device 701 may be a terminal device or a network device, or may be a chip or a circuit, such as a chip or a circuit that may be disposed in the terminal device or the network device.

The communication device may correspond to the terminal device in the foregoing methods. The communication device can implement the steps performed by the terminal device in the method corresponding to any one or more items shown in FIG. 7. The communication device may include a processing unit 702 and a transceiver unit 703.

In an optional implementation, when the communication device 701 is the foregoing terminal device, the processing unit 702 is configured to determine L SRS resources, where L is an integer greater than 1, and at least two of the L SRS resources correspond to different spatial relations; and the transceiver unit 703 is configured to perform Q PUSCH transmissions by using the L SRS resources, where Q is an integer greater than 1.

In an optional implementation, when the communication device 301 is the foregoing network device, the transceiver unit 703 is configured to: send first information to a terminal device, where the first information is used to indicate L SRS resources, L is an integer greater than 1, and at least two of the L SRS resources correspond to different spatial relations; and receive Q PUSCH transmissions sent by the terminal device by using the L SRS resources, where Q is an integer greater than 1.

For another network device-side solution, refer to the foregoing content. Details are not described herein again.

For concepts, explanations, detailed descriptions, and other steps of the communication device that are related to the technical solutions provided in embodiments of this application, refer to the descriptions of the content in the foregoing method embodiments or other embodiments. Details are not described herein again.

It may be understood that, for functions of the units in the communication device 701, refer to implementation of corresponding method embodiments. Details are not described herein again.

It should be understood that division into the foregoing units of the communication device is merely logical function division. During actual implementation, all or a part of the units may be integrated into one physical entity, or may be physically separated. In this embodiment of this application, the transceiver unit 703 may be implemented by the transceiver 303 in FIG. 8, and the processing unit 702 may be implemented by the processor 302 in FIG. 8.

Based on the method provided in embodiments of this application, this application further provides a computer program product. The computer program product includes computer program code. When the computer program code is run on a computer, the computer is enabled to perform the method in any one of the embodiments shown in FIG. 7.

According to the method provided in embodiments of this application, this application further provides a computer-readable storage medium. The computer-readable medium stores program code. When the program code is run on a computer, the computer is enabled to perform the method in any one of the embodiments shown in FIG. 7.

According to the method provided in embodiments of this application, this application further provides a system. The system includes the foregoing one or more terminal devices and the foregoing one or more network devices.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, procedures or functions according to embodiments of this application are all or partially generated. The computer may be a general-purpose computer, a dedicated computer, a computer network, or another programmable device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state drive (SSD)), or the like.

The network device and the terminal device in the foregoing device embodiments correspond to the network device or the terminal device in the method embodiments. A corresponding module or unit performs a corresponding step. For example, a communication unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

A person of ordinary skill in the art may be aware that, in combination with illustrative logical blocks described in embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, device, and unit, refer to a corresponding process in the foregoing method embodiments, and details are not described herein again.

In the several embodiments provided in this application, it should be understood that the disclosed system, device, and method may be implemented in other manners. For example, the described device embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces.

The indirect couplings or communication connections between the devices or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   determining, by a terminal device, L sounding reference signal (SRS) resources, wherein L is an integer greater than 1, and at least two SRS resources of the L SRS resources correspond to different spatial relations;
   determining, by the terminal device based on a first correspondence between an SRS resource and a physical uplink shared channel (PUSCH) transmission, an SRS resource used for each of Q PUSCH transmissions; and
   performing, by the terminal device, the Q PUSCH transmissions using the L SRS resources, wherein Q is an integer greater than 1;
   wherein the first correspondence between the SRS resource and the PUSCH transmission comprises:

sequentially mapping resources to all transmissions based on a configuration order of the resources, and if there is still a remaining quantity of transmissions to which no resource is mapped, sequentially and cyclically mapping the resources to the remaining quantity of transmissions based on the configuration order of the resources;

sequentially mapping resources to all transmission groups based on the configuration order of the resources using P continuous transmissions as one transmission group, and if there is still a remaining transmission group to which no resource is mapped, sequentially and cyclically mapping the resources to the remaining transmission group based on the configuration order of the resources, wherein P is an integer greater than 1; or sequentially mapping resources to all transmission groups based on the configuration order of the resources using the P continuous transmissions as the one transmission group, and if there is still the remaining quantity of transmissions to which no resource is mapped, sequentially and cyclically mapping the resources to the remaining quantity of transmissions based on the configuration order of the resources.

2. The method according to claim 1, wherein the determining, by the terminal device, the L SRS resources comprises:

receiving, by the terminal device, first information; and
determining, by the terminal device based on a field value of a first field in the first information and a preset correspondence between the field value and an SRS resource of the L SRS resources, the L SRS resources being indicated by the field value of the first field;

wherein the preset correspondence between the field value and the SRS resource satisfies:

one field value is used to indicate one or more SRS resources, and when the one field value is used to indicate a plurality of SRS resources, any two SRS resources of the plurality of SRS resources correspond to different spatial relations.

3. The method according to claim 1, wherein the performing, by the terminal device, the Q PUSCH transmissions using the L SRS resources comprises:

when an uplink transmission mode is uplink full power transmit mode 2, performing, by the terminal device, the Q PUSCH transmissions using the L SRS resources.

4. The method according to claim 1, wherein before the performing, by the terminal device, the Q PUSCH transmissions using the L SRS resources, the method further comprises:

determining, by the terminal device, a PUSCH repetition transmission mode, the PUSCH repetition transmission mode comprising one or more of the following:

simultaneous repetition transmission performed based on a plurality of SRS resources, the simultaneous repetition transmission indicating a PUSCH is simultaneously transmitted using the L SRS resources, and time domain resources corresponding to the L SRS resources are the same; and time-division repetition transmission performed based on the plurality of SRS resources, wherein the time-division repetition transmission indicating the PUSCH is transmitted in a time-division manner using the L SRS resources, and the time domain resources corresponding to the L SRS resources are different.

5. The method according to claim 1, wherein a value of P is reported by the terminal device to the network device using a terminal capability parameter.

6. The method according to claim 1, wherein if the network device indicates a plurality of SRS resources, and configures a PUSCH repetition transmission type as PUSCH repetition type B, the PUSCH transmission comprises E nominal transmissions, the Q PUSCH transmissions are Q actual transmissions corresponding to the E nominal transmissions, each nominal transmission corresponds to one or more actual transmissions, and E is a positive integer.

7. The method according to claim 1, wherein if the network device indicates a plurality of SRS resources, and configures a PUSCH repetition transmission type as PUSCH repetition type B, the PUSCH transmission comprises E nominal transmissions, each nominal transmission corresponds to one or more actual transmissions, and E is a positive integer; and the determining, by the terminal device based on the first correspondence between the SRS resource and the PUSCH transmission, the SRS resource used for each PUSCH transmission of the Q PUSCH transmissions comprises:

determining, by the terminal device based on the L SRS resources and the preset first correspondence between a resource and a quantity of transmissions, the SRS resource corresponding to the each nominal transmission of the E nominal transmissions; and determining, by the terminal device based on the SRS resource corresponding to the each nominal transmission, the SRS resource corresponding to an actual transmission corresponding to the nominal transmission.

8. The method according to claim 7, wherein the determining, by the terminal device based on the SRS resource corresponding to the each nominal transmission, the SRS resource corresponding to the actual transmission corresponding to the nominal transmission comprises:

for the each nominal transmission, determining the SRS resource corresponding to the nominal transmission is used for the actual transmission corresponding to the nominal transmission; or for the each nominal transmission, determining, based on the L SRS resources and the preset first correspondence between the resource and the quantity of transmissions, an actual transmission SRS resource used for each actual transmission corresponding to the nominal transmission, wherein a first actual transmission SRS resource corresponding to the first actual transmission corresponding to the nominal transmission is a first ranked SRS resource ranking first in a configuration order of the L SRS resources, or the SRS resource corresponding to the nominal transmission.

9. The method according to claim 1, wherein if the network device indicates a plurality of SRS resources, and configures the PUSCH repetition transmission type as PUSCH repetition type B, the PUSCH transmission comprises E nominal transmissions, each nominal transmission corresponds to one or more actual transmissions, and E is a positive integer; and before the performing, by the terminal device, Q PUSCH transmissions using the L SRS resources, the method further comprises:

determining, by the terminal device, a redundancy version (RV) identifier corresponding to the each nominal transmission of the E nominal transmissions; and determining, by the terminal device based on the RV identifier corresponding to the each nominal transmission, the RV identifier corresponding to each actual transmission corresponding to the nominal transmission;

wherein for the each nominal transmission, actual transmission RV identifiers corresponding to all actual transmissions corresponding to the nominal transmission are the RV identifier corresponding to the nominal transmission.

10. The method according to claim 8, wherein the determining, by the terminal device, an RV identifier corresponding to the each nominal transmission of the E nominal transmissions comprises:

when a first sorting relationship exists between a plurality of RV identifiers corresponding to the PUSCH transmission, sequentially and cyclically mapping the plurality of RV identifiers to all nominal transmissions based on an RV identifier indicated by downlink control information and the first sorting relationship.

11. The method according to claim 8, wherein the determining, by the terminal device, an RV identifier corresponding to each of the E nominal transmissions comprises:

for a nominal transmission corresponding to an indicated first SRS resource, sequentially and cyclically mapping, based on an RV identifier indicated by downlink control information and a second sorting relationship, a plurality of RV identifiers to the nominal transmissions corresponding to the SRS resource, wherein there is a difference of an offset value between an RV identifier of the each nominal transmission corresponding to an $(i+1)^{th}$ SRS resource and the RV identifier of each nominal transmission corresponding to an $i^{th}$ SRS resource, and i is a positive integer.

12. A communication device, comprising:

a processor coupled to a non-transitory memory and configured to execute program instructions stored in the non-transitory memory to cause the communication device to:

determine L sounding reference signal (SRS) resources, wherein L is an integer greater than 1, and at least two SRS resources of the L SRS resources correspond to different spatial relations;

determine, based on a first correspondence between an SRS resource and a physical uplink shared channel (PUSCH) transmission, an SRS resource used for each of Q PUSCH transmissions; and perform the Q PUSCH transmissions using the L SRS resources, wherein Q is an integer greater than 1;

wherein the first correspondence between the SRS resource and the PUSCH transmission comprises:

sequentially mapping resources to all transmissions based on a configuration order of the resources, and if there is still a remaining quantity of transmissions to which no resource is mapped, sequentially and cyclically mapping the resources to the remaining quantity of transmissions based on the configuration order of the resources;

sequentially mapping resources to all transmission groups based on the configuration order of the resources using P continuous transmissions as one transmission group, and if there is still a remaining transmission group to which no resource is mapped, sequentially and cyclically mapping the resources to the remaining transmission group based on the configuration order of the resources, wherein P is an integer greater than 1; or sequentially mapping resources to all transmission groups based on the configuration order of the resources using the P continuous transmissions as the one transmission group, and if there is still the remaining quantity of transmissions to which no resource is mapped, sequentially and cyclically mapping the resources to the remaining quantity of transmissions based on the configuration order of the resources.

13. The communication device according to claim 12, wherein the processor is configured to determine, based on a field value of a first field in received first information and a preset correspondence between the field value and an SRS resource of the L SRS resources, the L SRS resources being indicated by the field value of the first field;

wherein the preset correspondence between the field value and the SRS resource satisfies:

one field value is used to indicate one or more SRS resources, and when the on e field value is used to indicate a plurality of SRS resources, any two SRS resources of the plurality of SRS resources correspond to different spatial relations.

14. The communication device according to claim 12, wherein the processor is configured to:

when an uplink transmission mode is uplink full power transmit mode 2, perform the Q PUSCH transmissions using the L SRS resources and using the transceiver.

15. The communication device according to claim 12, wherein the processor is further configured to:

determine a PUSCH repetition transmission mode;

wherein the PUSCH repetition transmission mode comprises one or more of the following:

simultaneous repetition transmission performed based on a plurality of SRS resources, the simultaneous repetition transmission indicating a PUSCH is simultaneously transmitted using the L SRS resources, and time domain resources corresponding to the L SRS resources are the same; and time-division repetition transmission performed based on the plurality of SRS resources, wherein the time-division repetition transmission indicating the PUSCH is transmitted in a time-division manner using the L SRS resources, and the time domain resources corresponding to the L SRS resources are different.

16. The communication device according to claim 15, wherein the processor is configured to:

if a network device indicates the L SRSs, and one or more of the following conditions are satisfied, determine to use the mode of simultaneous repetition transmission performed based on a plurality of SRS resources:

the network device indicates the PUSCH transmission mode is the simultaneous repetition transmission;

the network device indicates a PUSCH transmission quantity is equal to 1;

the network device does not indicate the PUSCH transmissions quantity; or demodulation reference signal (DMRS) ports indicated by the network device belong to a same DMRS code division multiplexing (CDM) group.

17. The communication device according to claim 15, wherein the processor is configured to:

if a network device indicates the L SRSs, and one or more of the following conditions are satisfied, determine that the network device uses the mode of time-division repetition transmission performed based on the plurality of SRS resources:

the network device indicates the PUSCH transmission mode is time-division repetition transmission;

the network device indicates the PUSCH transmissions quantity is greater than 1; or DMRS ports indicated by the network device belong to a same DMRS CDM group.

* * * * *